United States Patent [19]

Meyer et al.

[11] Patent Number: 5,218,529

[45] Date of Patent: Jun. 8, 1993

[54] NEURAL NETWORK SYSTEM AND METHODS FOR ANALYSIS OF ORGANIC MATERIALS AND STRUCTURES USING SPECTRAL DATA

[75] Inventors: Bernd J. Meyer, Athens; Jeffrey P. Sellers, Suwanee, both of Ga.; Jan U. Thomsen, Fredricksberg, Denmark

[73] Assignee: University of Georgia Research Foundation, Inc., Athens, Ga.

[21] Appl. No.: 559,649

[22] Filed: Jul. 30, 1990

[51] Int. Cl.$^5$ .............................................. G06F 15/42
[52] U.S. Cl. ............................... 364/413.01; 364/400
[58] Field of Search ..................... 364/413.01, 497, 498

[56] References Cited

U.S. PATENT DOCUMENTS 4,875,183 10/1989 Graf et al. .
4,876,731 10/1989 Loris et al. ............................ 382/40

OTHER PUBLICATIONS

Borman, Stu, "Neural Network Applications in Chemistry Begin to Appear," *Chemical & Engineering News*, Apr. 24, 1989, pp. 24-28.

Fukushima, Kunihiko, "A Neural Network Model for Selective Attention in Visual Pattern Recognition," *Biological Cybernetcs*, Oct. 1986, vol. 55, No. 1, pp. 5-15.

Holley, L. Howard and Martin Karpuls, "Protein Secondary Structure Prediction with a Neural Network," *Proc. Natl. Acad. Sci. USA, Jan. 1989, vol. 86, pp. 152-156.*

Hopfield, John J. and David W. Tank, "Computing with Neural Circuits: A Model," *Science*, Aug. 8, 1986, vol. 233, No. 4764, pp. 233, 625-633.

Lukashima, A. V., V. V. Anshelevich, B. R. Amirikyan, A. I. Gregerov and M. D. Frank-Kamenetskii, "Neural Network Models for Promoter Recognition," *Journal of Biomolecular Structure & Dynamics*, 1989, vol. 6, pp. 1123-1133.

Quian, Ning and Terrence J. Sejnowski, "Predicting the Secondary Structure of Globular Proteins Using Neural Network Models," *J. Mod. Biol.*, 1988, pp. 865-884.

Scalettar, R. and A. Zee, "Emergence of Grandmother Memory in Feed Forward Networks: Learning with Noise and Forgetfulness," *Parallel Distributed Processing*, Chapter 11, pp. 309-327 (Rumelhart, et al., ed. 1986).

Sejnowski, Terrence J., Christof Koch, and Patricia S. Churchland, "Computational Neuroscience," *Science*, Sep. 9, 1988, vol. 241, No. 4871, pp. 1299-1305.

Three pages of material promulaged by Sprouse Scientific Systems, Inc. and entitled "Sprouse Info—Sachem TM".

Thomsen, J. U. and B. Meyer, "Pattern Recognition of the $^1$H NMR Spectra of Sugar Alditols Using a Neural Network," *Journal of Magnetic Resonance*, 1989, vol. 84, pp. 212-217.

Shea, Patrick M., "Detection of Explosives in Checked Airline Baggage using an Artificial Neural System"; 1989.

Cortes, C., "A Network System for Image Segmentation" Jun. 1989.

Bhat Naveen V., "Modeling Chemical Process Systems via Neural Computation" 1990.

Yates, "Autonomous Explorations System: Techniques for Interpretation of Multispectral Data" Sprouse Info Sachem.

*Primary Examiner*—Gail O. Hayes
*Attorney, Agent, or Firm*—Kilpatrick & Cody

[57] ABSTRACT

Apparatus and processes for recognizing and identifying materials. Characteristic spectra are obtained for the materials via spectroscopy techniques including nuclear magnetic resonance spectroscopy, infrared absorption analysis, x-ray analysis, mass spectroscopy and gas chromatography. Desired portions of the spectra may be selected and then placed in proper form and format for presentation to a number of input layer neurons in an offline neural network. The network is first trained according to a predetermined training process; it may then be employed to identify particular materials. Such apparatus and processes are particularly useful for recognizing and identifying organic compounds such as complex carbohydrates, whose spectra conventionally require a high level of training and many hours of hard work to identify, and are frequently indistinguishable from one another by human interpretation.

57 Claims, 11 Drawing Sheets

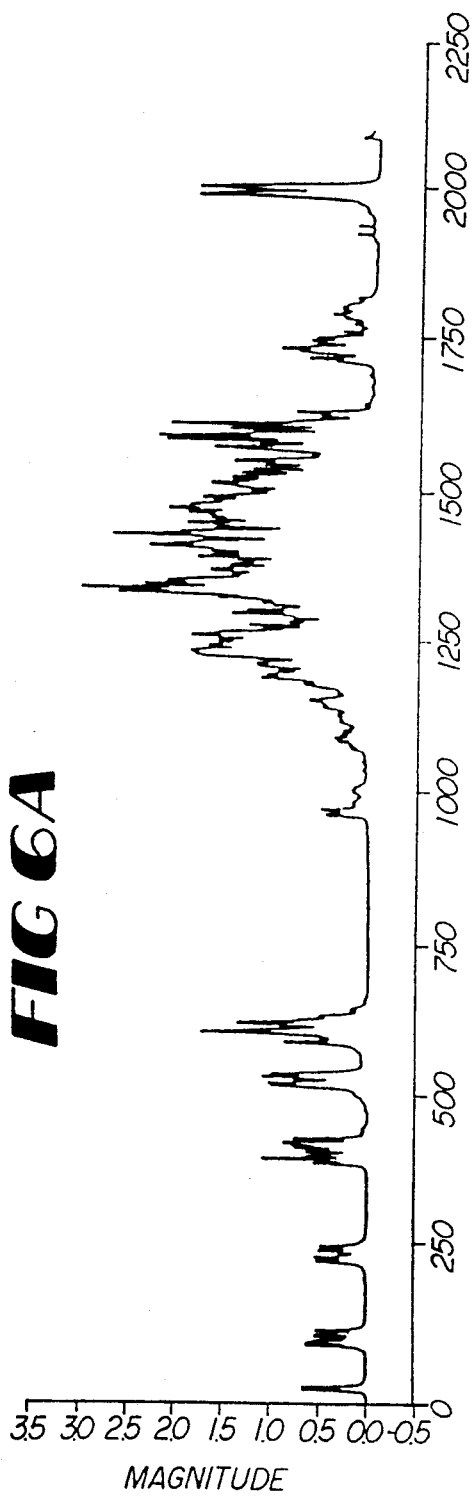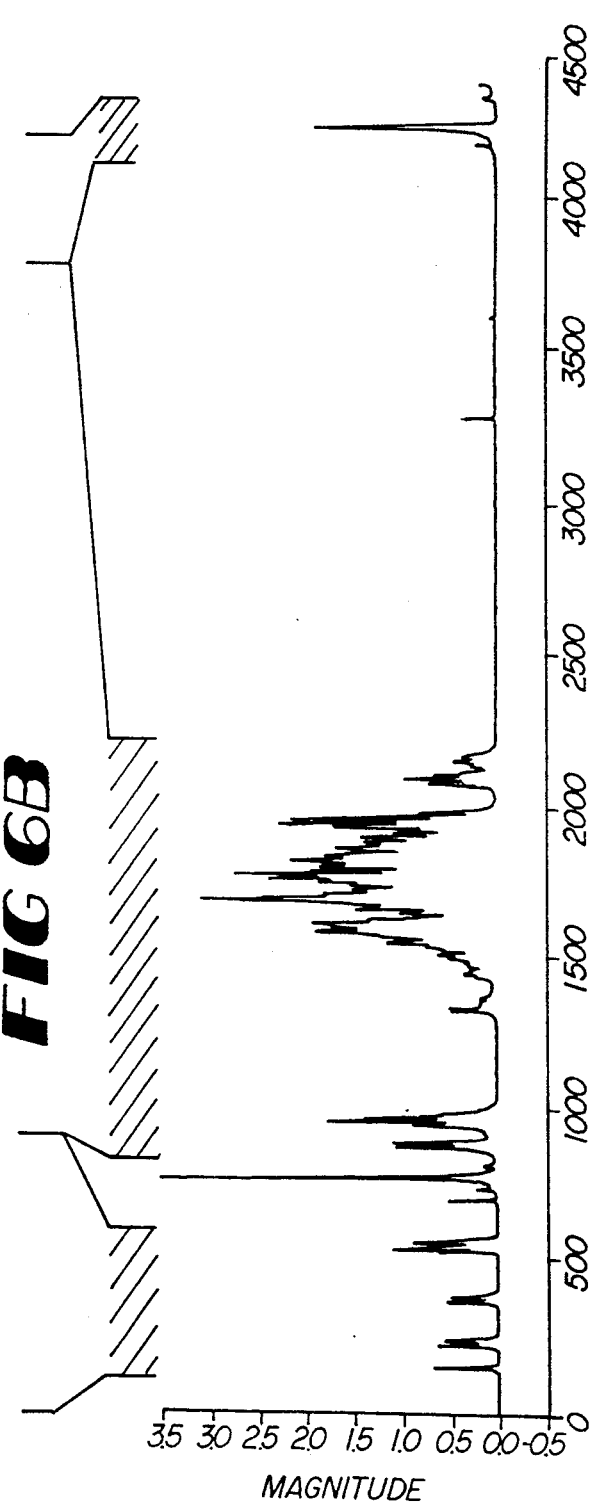

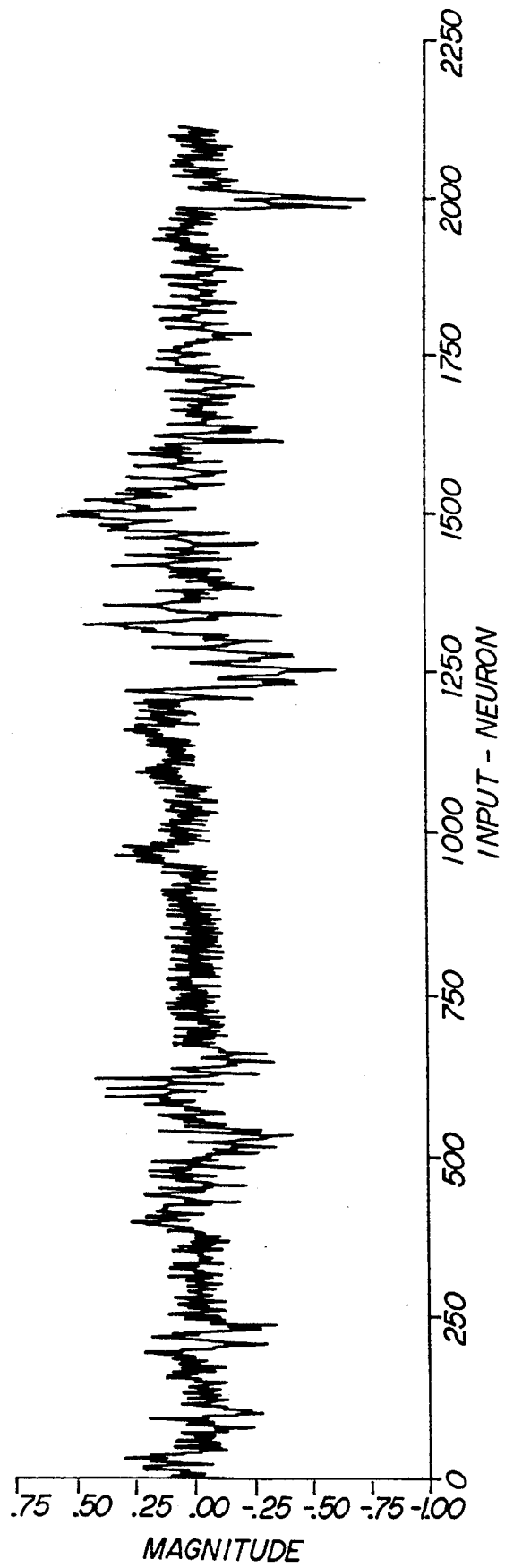

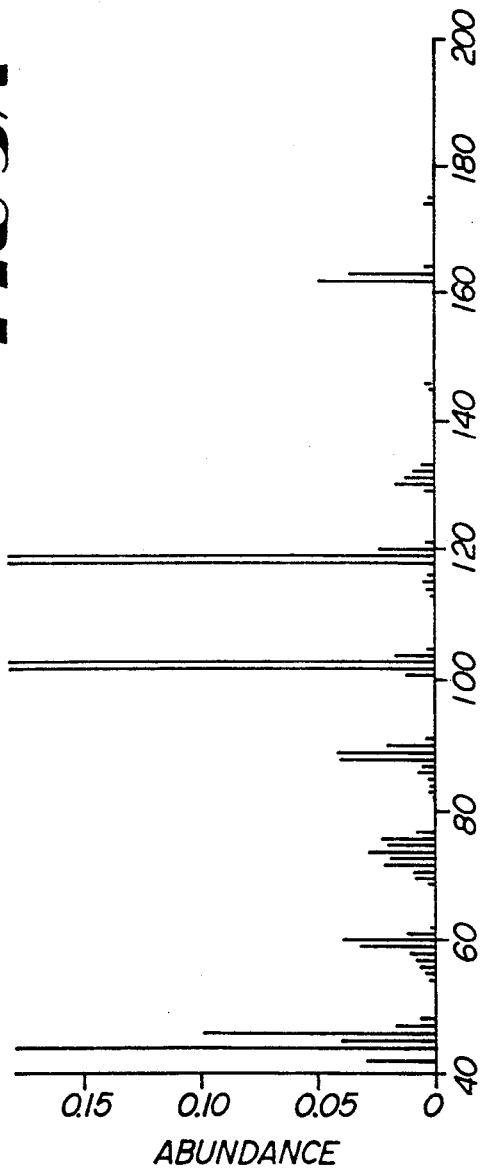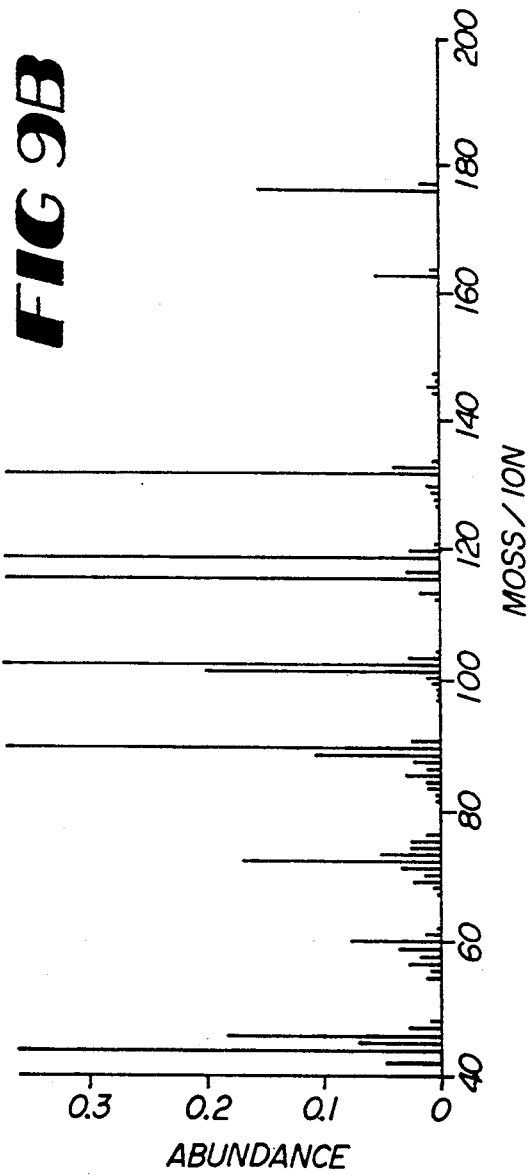

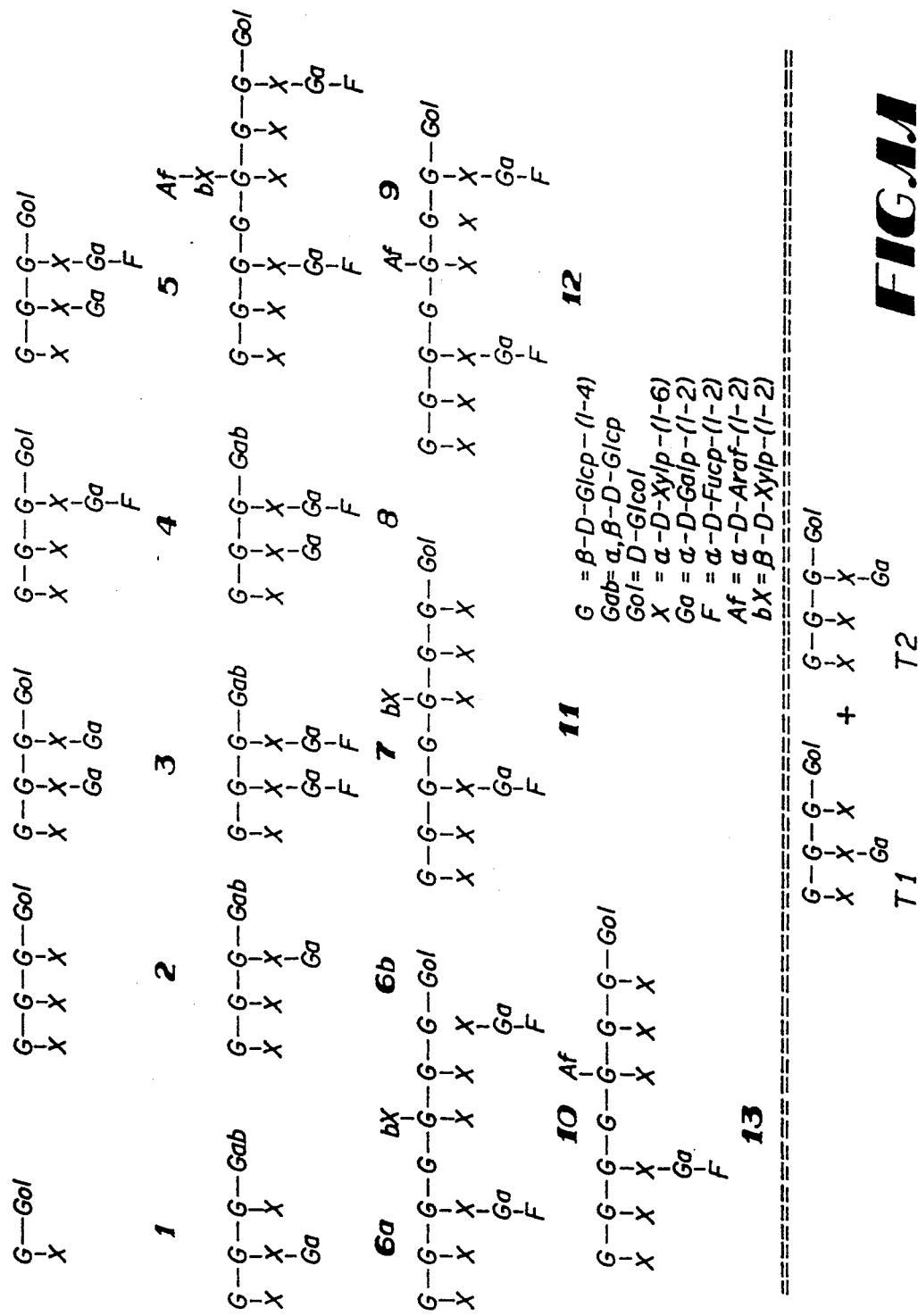

NEURAL NETWORK SYSTEM AND METHODS FOR ANALYSIS OF ORGANIC MATERIALS AND STRUCTURES USING SPECTRAL DATA

This invention was made with government support under Grant/Contract numbers DE-FG09-85ER13426 and DE-FG09-87ER13810 awarded by the Department of Energy. The government has certain rights in the invention.

This invention relates to the use of neural networks to analyze and identify particular materials by recognizing patterns in spectra that are characteristic of such materials. The invention has particular utility in analyzing and identifying complex organic molecules, such as, for instance, complex carbohydrate.

BACKGROUND OF THE INVENTION

In general, the incorporation of digital systems into modern analytical instrumentation has generated immense quantities of data. The increases in the quantity of data collected have not been matched by corresponding gains in information extraction techniques. An important step in more efficient and effective information extraction is the development of pattern recognition systems capable of handling data that are generated by different analytical techniques.

Researchers commonly use mass, infrared and nuclear magnetic resonance and other spectra in solving structure elucidation problems of various materials, and particularly organic molecules. The amount of information produced by these techniques can be overwhelming. The need to extract information from such large databases has given rise to the development of computerized information systems. The abilities of these information systems vary from retrieval of stored spectra to pattern recognition to spectral simulation. The systems that have been developed are based on library search and interpretative techniques.

PREVIOUS TECHNIQUES

The computer-based information systems that use library search methods compare unknown spectra to each spectrum in a reference library. Each spectrum is typically stored in a reduced form to expedite the retrieval and comparison process. Systems using library search methods are the most common type of computer-based information systems available. Some of the earliest systems were created for libraries of mass spectra, and mass spectral search systems continue to be developed. Library search systems have also been reported for infrared spectra, and many $^{13}$C-NMR databases and associated retrieval techniques have been developed. Efforts are underway to create a database for $^{13}$C-NMR spectra originating from biological sources.

The power of $^1$H-NMR techniques in determining carbohydrate structures has been demonstrated repeatedly. Databases containing $^1$H-NMR spectra have been developed, and pattern recognition techniques can be applied to 2-D NMR spectra. However, development of computer-aided library search methods for $^1$H-NMR spectra is complicated by the relatively poor reproducability of the spectra of a given molecule under normal experimental conditions. A retrieval method for $^1$H-NMR spectra based on chemical shifts for spectra acquired under highly controlled conditions has been developed, for instance, but presently requires standardized conditions.

Systems based on an interpretative approach to structure elucidation use data-structure representations that differ from library search methods. Database systems developed to assist researchers in the interpretation of analytical results contain spectral data as well as information such as how the sample was prepared, its origin, its concentration, etc. This procedural information is required for the available methods of advanced interpretation of particular spectra for structural identification. Systems that use interpretative methods for handling chemical information have played a pioneering role in the evolution of software used in expert system development. Examples are DENDRAL [see R. K. Lindsay, et al., *Applications of Artificial Intelligence for Organic Chemistry: the DENDRAL Project* (1980); D. H. Smith, et al., 133 Anal. Chim. Acta 471 (1981)]; DARC [see J. E. Dubios, et al., 25 J. Chem. Inf. Comput. Sci 326-33 (1985)]; CASE see C. A. Shelley, et al., 133 Anal. Chim. Acta 507-16 (1981); C. A. Shelley, et al., "Computer Assisted Structure Elucidation," 54 ACS Symposium Series, p. 92 (1977)] and CHEMICS [see H. I. Abe, et al., 1 Comput. Enhanced Spectrosc. 55-62 (1983); S. Sasaki, et al., *Computer Applications In Chemistry*, 185-206 (S. Heller, et al., ed. 1983)].

In the oligo- and polysaccharide field, for instance, the $^1$H-NMR signals of a glycosyl residue carry information on the nature of that residue and on the environment of the residue within the molecule. The influence of the molecular environment includes the points of attachment of other glycosyl residues and non-glycosyl substituents to the residue in question. Furthermore, the orientation in space of the residues in question relative to neighboring residues affects the chemical shifts of NMR signals of the residue in question. This has been experimentally proven by showing that the $^{13}$C-NMR chemical shifts of oligosaccharides depend on the conformation of the glycosidic bonds. This concept has been used to analyze glycosidation shifts of $^{13}$C-NMR spectra of oligosaccharides which, in turn led to the development of the program CASPER.

The success of the structural reporter group concept established a similar dependence of $^1$H-NMR chemical shifts on the residues close in space. However, the structural reporter group concept has limitations because it uses only a few of the NMR signals to identify glycosyl residues of oligosaccharides. The structural reporter group concept fails to work in many circumstances because the chemical shift for the anomeric proton of a glycosyl residue is affected by changes in the proton's chemical environment. Even though these analytical tools are helpful in interpreting NMR spectra, analysis of all of the NMR signals from oligosaccharides is a far more reliable way to fully characterize their structures. However, it requires great skill, relatively large amounts of highly purified samples and costly instrument time for analysts to completely assign all the signals of NMR spectra by available 1-D and 2-D techniques.

NEURAL NETWORKS

The ability of artificial neural networks to recognize patterns has recently received much attention. The underlying theme behind the development of artificial neural networks was an attempt to simulate the parallel processing of the human brain deduced from the perceived manner by which the brain recognizes pictures or speech. A variety of neural network architectures and training schemes have been described and variations in the response behavior of neural networks have been reported.

A common type of neural network known as a hidden-layer feedforward network consists of an input layer of neurons or nodes, at least one hidden layer, and an output layer. The neuron layers are linked via a set of synaptic interconnections that are defined at the design stage of the network. Each neuron in the input layer is typically connected to each neuron in the hidden layer, and each neuron in the hidden layer is typically connected to each neuron in the output layer, via a synaptic connection; these may be physical, electronic connections, or they may be embodied in software, as may be the neurons themselves, which software operates on conventional digital computers. The network is trained by presenting the desired response to the output layer of neurons and by simultaneously presenting the input neuron layer with the patterns that need to be distinguished. Connection strengths are developed by the network as it uses one of several learning algorithms. After a certain number of training iterations, information may be presented to the input neurons, which then propagate signals through the network in a feedforward (afferent) manner ultimately causing the output layer to indicate a proper response.

Neural networks having no hidden layers, sometimes referred to as "perceptrons," may also be used in the present invention. Such networks generally produce less reliable information than do networks with hidden layers when used in applications such as in the present invention, however, perhaps because hidden layers allow a network to map output patterns to structurally dissimilar input patterns.

The iterative training process of artificial neural networks extracts characteristic information from an input in order to decide which output will result. Thus, in contrast to a rule-based system in which the expert must specify the constraints, neural networks select the rules by themselves during the training process ("learning"). Each neuron has one or more input values, one output value, and a threshold. In the input layer of neural networks according to the present invention, the output of a neuron is preferably, but need not be, equal to its input. The output value of any higher level neuron is computed according to an activation or squashing function using the input values and its threshold. The threshold determines "how high" the input to that neuron must be in order to generate a positive output of that neuron. The connection between two neurons is realized in mathematical terms by multiplying the output of the lower level neuron by the strength of that connection (weight). The output response of any hidden layer neuron ($o_j$) and any output layer neuron is a function of the network input to that neuron defined by the difference of that neuron's threshold ($\theta$) and the input to it. The value of the input into each hidden or output layer neuron is weighted with the weight currently stored for the connection strengths between each of the input and hidden layer neurons, and the hidden and output layer neurons, respectively. Summation over all connections into a particular neuron and subtracting this sum from the threshold value may be performed according to the following sigmoid-type Fermi function:

$$o_j = [1 + \exp(\theta_j - \Sigma_i w_{ji} * o_i)]^{-1};$$

where i and j represent neurons of two different layers with j representing the higher layer; $\theta_j$ represents the bias value for j layer neuron; $w_{ji}$ represents the strength of the connection between neuron i and neuron j. Alternatively, sine-type functions may be used to obtain the desired type of response function for the output of a neuron. A neuron may be considered to be "turned on", for instance, whenever its value is above a predetermined value such as, for instance, 0.9 and "turned off" with a value of less than another value such as 0.1, and has an undefined "maybe" state between those values. The desired output pattern for each input pattern is defined by the user. The network, through an iterative back-propagation, establishes a set of weights and thresholds for every neural connection that produces the desired output pattern for the presented input information. The learned information of a neural network is contained in the values of the set of weights and thresholds.

The back-propagation learning process is described in D. E. Rumelhart, et al., *Parallel Distributed Processing*, ch. 8, pp. 322-28 (MIT Press, 1986), which is incorporated herein by this reference, and which represents a portion of the state of the art. The procedure involves a set of pairs of input and output vectors. The network uses an input vector to generate its own, or actual, output vector. The actual output vector is compared with a desired output, or target, vector. The synaptic weights are changed to reduce the difference between the target vector and the actual output vector. The conventional delta rule is used for this calculation; the weight for a particular synapse or connection between units is adjusted proportionally to the product of an error signal, delta, available to the unit receiving input via the connection and the output of the unit sending a signal via the connection. If a unit is an output unit, the error signal is proportional to the difference between the actual and target value of the unit; if a hidden layer, it is determined recursively in terms of the error signals of the units to which it directly connects and the weights of those connections.

In the back propagation learning process, the input vector is presented and propagated forward through the network to generate the actual output vector. That vector is compared with the target vector, resulting in an error signal for each output unit. Weight changes are then computed for all connections that feed into the output layer. Deltas are then calculated for all units in the next layer, and the process is repeated.

Other artificial neural network schemes (ANS) include nonlinear networks as described in the works of Stephen Grossberg, including, for instance, S. Grossberg, *Neural Networks*, (1987). These allow unsupervised learning and perhaps more closely simulate cognitive processes of the human brain than the back-propagation off-line networks described above. Such procedures typically use bidirectional feedback between mathematical models of short- and long-term memory to determine the connection strengths between the neurons, and thus allow self-stabilizing adaptive pattern recognition in response to complex real time nonstationary input environments, in distinction to the back propagation, off-line techniques described above. ("Off-line" as used in this document means any learning scheme or neural network which does not compensate for short- and long-term memory in determining the connection strengths between neurons or units.) See, S. Grossberg, *Nonlinear Neural Networks: Principles, Mechanisms, and*

*Architectures*, lecture at National Science Foundation meeting on Neural Networks and Neuromorphic Systems, Woburn, Mass. (Oct. 7, 1986). Such networks may serve as an alternative architecture for use of artificial neural networks for the recognition of materials via their spectra, but there remains a question as to whether the added complexity is justified in an input environment which is arguably not real time. Furthermore, supervised learning allows the network to incorporate and reflect all previously known materials and their corresponding spectra, unlike the Grossberg-type unsupervised systems.

In addition to the back-propagation method described above, several other off-line variations of the learning scheme have been proposed to improve the speed and stability of the training process. These include stochastic learning, which is said to have superior performance over the steepest-descent algorithm normally used, and "forgetting" during the learning process to improve the network's ability to find the global minimum for the weights and thresholds. Recently, feed-forward neural networks with one hidden layer of neurons have been shown to be effective in speech recognition; the same architecture shows promise in predicting, from amino acid sequences, the secondary structure of proteins. Only a small amount of experimental work has been published demonstrating the utility of neural networks in natural product chemistry. Several attempts have been made to utilize neural networks to resolve 3-D structural patterns of proteins from their amino acid sequences. Networks have been designed that can predict with up to 79% accuracy the secondary structure of peptides from knowledge of their amino acid sequences. L. H. Holley & M. Karplus, 86 Proc. Acad. Natl. Acad. Sci. USA 152 (1989). The information used to teach the network was the available 3-D structures and associated amino acid sequences of proteins obtained by X-ray crystal structure analyses. Neural networks have also been successfully used in locating promotor sites in DNA sequences, as discussed in A. V. Lukashin, et al., 6 J. Biomol. Struct. & Dynam. 1123-33 (1989).

SUMMARY OF THE INVENTION

Techniques and apparatus according to the present invention capitalize on the ability of a neural network to "learn" (store as synaptic weights and neural threshold values) spectral information relating to a large number of materials. The network is used in combination with spectrum analysis devices, the spectral output of which is analyzed incrementally in a manner that allows incremental spectral data to be presented to the input neurons of the network. The network, whose input and output neurons are previously "trained" with a number of known spectra and identification data, respectively, identifies, via its output layer, the material associated with the particular spectral data presented to the input layer. The neural network can identify in fractions of a second materials whose identification previously required the expertise and prolonged efforts of graduate level researchers.

The primary advantage of neural networks over standard library search algorithms is that the neural network does not require rules defining the experimental variations which may occur. The neural network approach is potentially more powerful than library searches because different molecules show different sensitivities towards the variation of experimental conditions. Accommodation for these variations could easily be implemented into a neural network approach from the training set but is much more difficult to implement into a normal library search.

The present invention is particularly useful in the recognition of complex organic structures. Knowledge of the structures of complex carbohydrates, for instance, is important in biology and medicine and has become an important topic in the recombinant protein pharmaceutical field. The pattern-recognition capabilities of the present invention accelerate the pace of carbohydrate structure analysis by reducing the required labor and, in many cases, reducing the amount of sample required.

Highly trained personnel and sophisticated equipment are required to determine the primary structure of an oligosaccharide, and, even under these conditions, the analysis can take many weeks or months to accomplish. Scientists often find that the structures of the carbohydrates they are evaluating turn out to be the same or similar to the structures of molecules that have already been structurally characterized which results in a great deal of time and effort being wasted. Therefore, an object of the invention is to make the structural information of NMR spectra of previously characterized molecules readily available to research scientists. As an example, entry of ~2000 carbohydrate structures taken from the literature into a database developed in the Complex Carbohydrate Research Center and Department of Biochemistry at the University of Georgia in Athens, Ga. revealed after analysis that only ~1500 structures were unique. In other words, ~25% of the structures thought to be unique in the literature were duplicates. Other efforts to elucidate carbohydrate structure undoubtedly led to structures that were recognized as duplicates and were, therefore, not added to the literature, but the wasted effort by the analyst and expense were still incurred. Such duplication of effort occurs because there is currently no way to determine if the structure of a complex carbohydrate being characterized has already been described in the literature until the structure of the carbohydrate under investigation has been fully elucidated. The neural network-driven pattern recognition apparatus and techniques according to the present invention will allow researchers to determine, at a much earlier stage during analysis, if the structure they are working on has been characterized previously.

The elucidation of complex carbohydrate structures often relies heavily on $^1$H-NMR spectra, as they provide a great deal of structural information from a relatively moderate amount (~100 nmol) of sample. By contrast, $^{13}$C-NMR spectroscopy requires approximately 100 times more of the compound. Other analytical techniques such as mass spectroscopic analysis and GC and LC retention times are also important in elucidating the structure of oligosaccharides, and usually require even less sample (approximately 10 nmol) than is required for $^1$H-NMR analysis. Another difference between $^{13}$C-NMR and $^1$H-NMR spectra lies in the reproducability of the spectra. $^{13}$C-NMR spectra are much more reproducible than $^1$H-NMR spectra because the carbon atoms are not as strongly affected as hydrogen atoms by changes in the environment. Thus, normal library search methods are much less suited for $^1$H-NMR spectra than for $^{13}$C-NMR spectra.

The present invention has a number of implications involving the analysis of biologically important polymers. So far among biopolymers, the structural determination of oligo- and polysaccharides requires the most effort. There is no automatic or semiautomatic procedure for doing this analysis. The implementation of neural network analyses of 1-D $^1$H-NMR spectra in combination with chromatographic data could lead to the development of a fully automated system for oligosaccharide analysis. This could have major impacts on the diagnosis of glycosyl storage diseases and other enzymatic defects that cause a wrong glycosylation of proteins or lipids. Furthermore, extension of such techniques may prove to be important for other biopolymers such as proteins, RNAs and DNAs. Aspects of the invention related to the recognition of mass spectra of partially methylated alditol acetates could also be extended to other GC-MS methods.

Artificial neural network-based pattern recognition systems according to the present invention have been used to identify one-dimensional (1-D) $^1$H-NMR spectra of complex carbohydrates Such networks for recognition of $^1$H-NMR spectra can compare the spectral pattern of a newly recorded compound with spectral patterns stored as synaptic weights and neural threshold values in the neural network. For instance, software-emulated artificial neural networks can recognize individual 1-D $^1$H-NMR spectra of large oligosaccharides within a set of closely related 1-D $^1$H-NMR spectra. Neural networks can also accommodate the normal imprecisions of $^1$H-NMR spectra, including those resulting from differences in chemical shifts due to concentration or temperature variations, different signal-to-noise (S/N) ratios, variable absolute signal intensities, and different line widths. The ability to accommodate these variables is critical for a pattern-recognition technique to be useful for structural analysis under normal laboratory conditions.

Neural networks may be used according to the present invention to discriminate between closely related carbohydrates within a large dataset by using free induction decay (FID) data. A primary advantage of FIDs is that they can provide a wide range of scaling possibilities. Furthermore, neural networks may be used according to the present invention to achieve recognition of molecules which only have close relatives but not identical structures already represented in the knowledge base of the neural network, such as, for instance, oligosaccharide substructures. Several neural networks, each designed to accommodate one class or family of oligosaccharide spectra, can be used.

According to another aspect of the present invention, neural network-based systems may be used to identify partially methylated alditol acetates (PMAAs) derived from complex carbohydrates from gas chromatography-electron impact mass spectra. Neural networks can be easily trained to recognize the electron-impact mass spectra of partially methylated alditol acetates. These derivatives are used to determine glycosyl linkage positions. Neural networks that include gas chromatographic retention times of the derivatives in the input data may be used to enhance the recognition of molecular chirality. Neural network systems according to the present invention have achieved partial recognition of stereochemical differences from mass spectra—a task not previously achieved by scientists. A combination of mass spectroscopic information with GC retention times can provide redundancy in such determination of stereoisomers. Additionally, to optimize the neural network for wide-ranging experimental conditions, ratios of peak intensities in GC-MS data may be analyzed.

The ability of neural networks to achieve recognition of partially methylated alditol acetates may be enhanced by training them with scans from the MS originating from different GC injections. The variations contained in a training set of MS scans from different GC injections increase the neural network's tolerance to such variations.

BRIEF DESCRIPTION OF THE DRAWINGS

FIGS. 6A-6B shows examples for the generation of input patterns as shown in FIG. 5, and as discussed in Example II, from the spectra of structures shown in FIG. 4.

FIG. 7 shows a synaptic weight plot of the connections between input neurons and one hidden layer neuron of a neural network (NN-1) discussed in Example II.

FIGS. 9A-9B shows selected mass spectra of structures 21 and 29 shown in FIG. 8.

FIG. 11 shows structures of 14 complex oligosaccharides entered into a neural network training set according to the present invention, and two test materials whose close relatives among the oligosaccharides were identified.

DETAILED DESCRIPTION

Example I

Alditol spectra were subjected to analysis using neural networks according to the present invention as a preliminary procedure because alditols exhibit a variety of characteristics including (i) highly degenerate spectra (i.e. galactitol), (ii) different numbers of protons in some of the spectra (i.e. pentitols vs. hexitols), (iii) spectra with all of the signals resolved and of first order (i.e. arabinitol), and (iv) spectra with no individually resolved signals of high order (i.e. ribitol).

Figure 1:
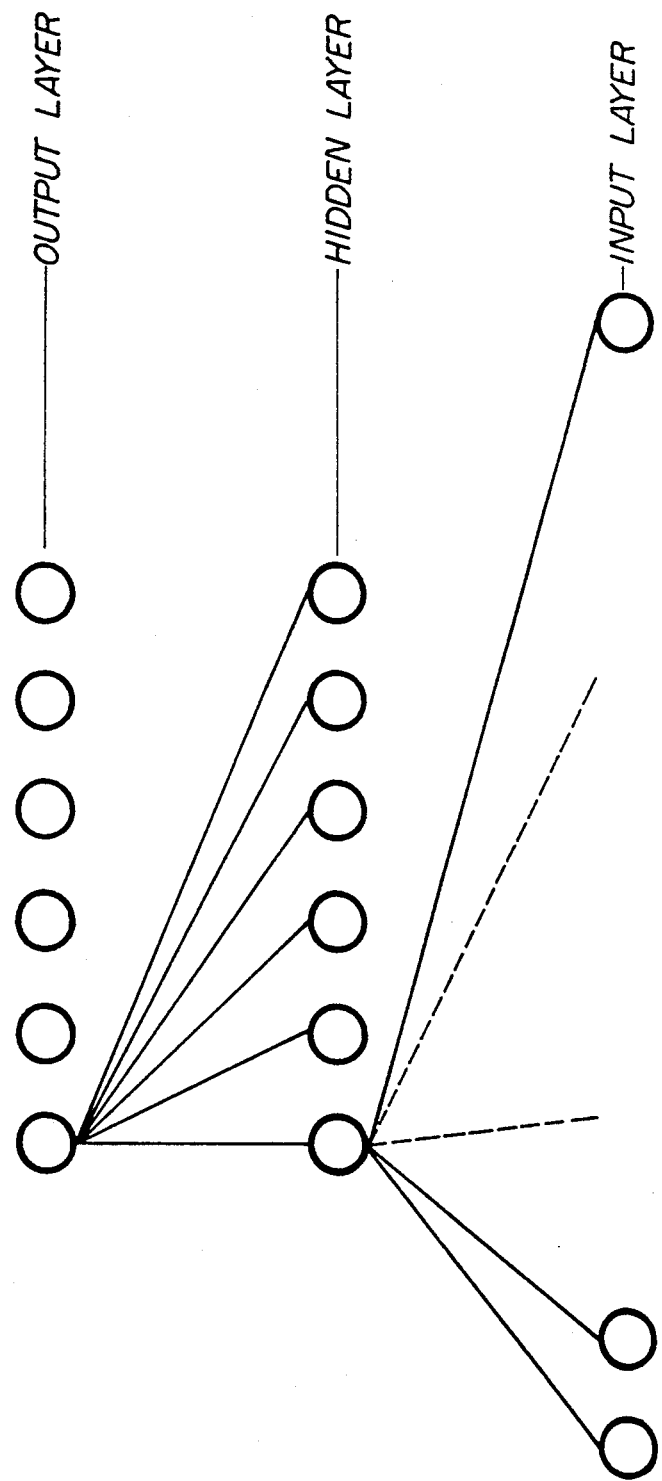
FIG. 1 is a schematic representation of a neural network which contains an input layer, a hidden layer and an output layer of neurons.
Figure 2A:
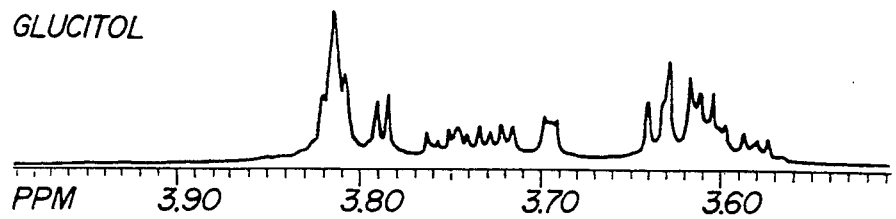
FIGS. 2A-2F shows 500 MHz $^1$H-NMR spectra of six sugar alditols from which information was presented to and identified by neural networks as discussed in Example I, below.
Figure 2B:
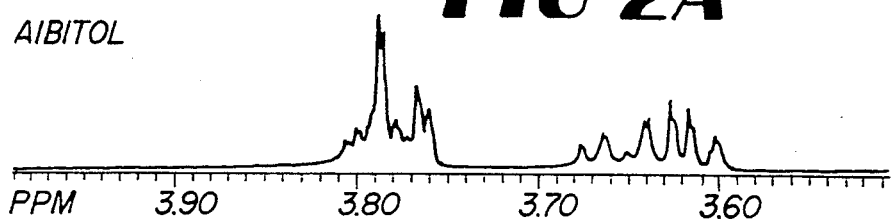
Figure 2C:
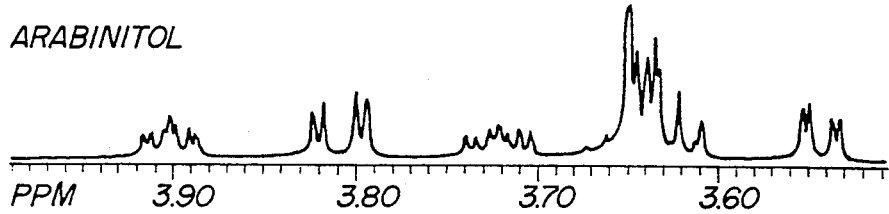
Figure 2D:
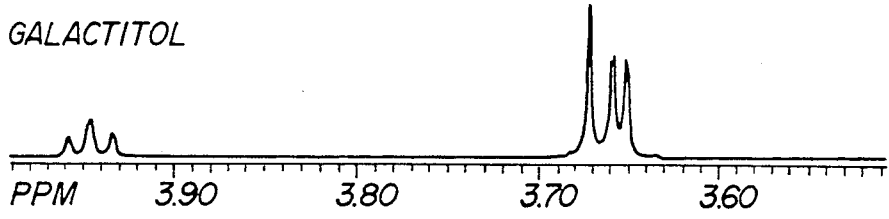
Figure 2E:
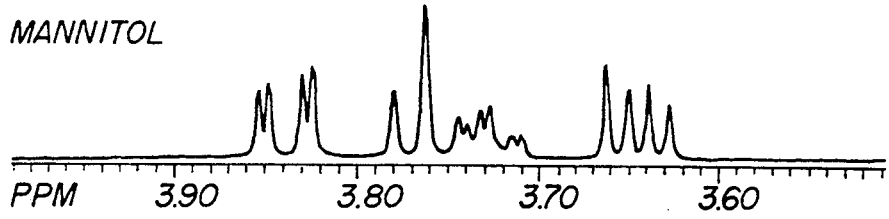
Figure 2F:
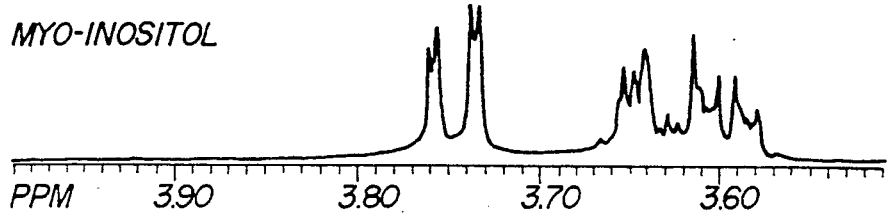
Figure 3A:
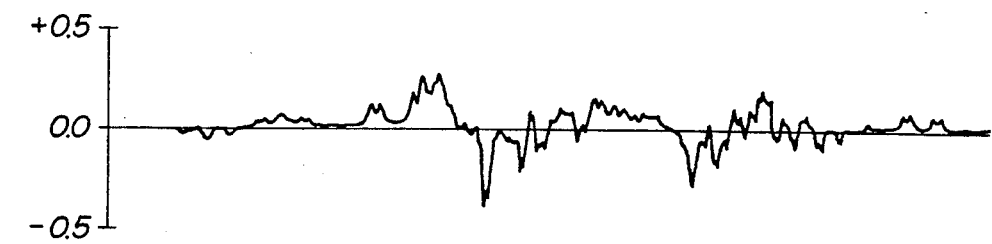
FIGS. 3A-3F shows plots of the synaptic weights of the input layer-hidden layer connections of a neural network which was trained as discussed in Example I with spectral information from the six sugar alditols.
Figure 3B:
Figure 3C:
Figure 3D:
Figure 3E:
Figure 3F:
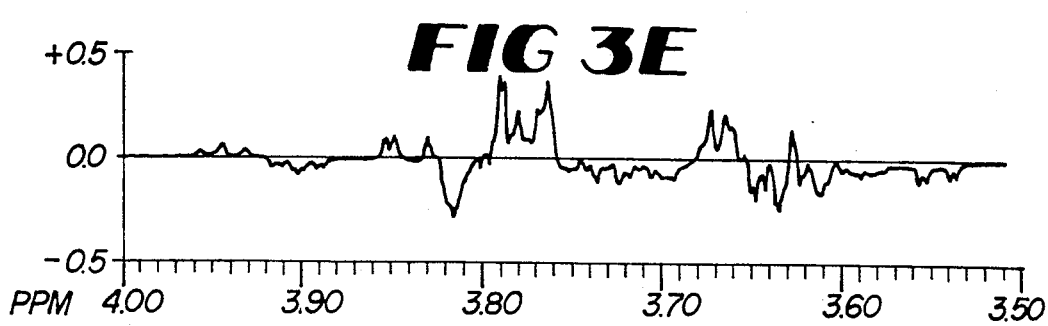

A three-layered feedforward neural network using a back propagation learning scheme as described in D. E. Rumelhart, et al., *Parallel Distributed Processing*, ch. 8 (MIT Press, 1986) was used. The architecture is shown in FIG. 1. The network includes an input layer of 400 input neurons, each of which feed a layer of 6 hidden neurons, which in turn feed an output layer of 6 output neurons. The input layer neurons simply transmit their input values as output. The output $o_j$ of the j'th hidden- or output-layer neuron is given by the logistic semilinear activation function:

$$o_j = [1 + \exp(\theta_j - \Sigma_i w_{ji} * o_i)]^{-1};$$

where i and j represent neurons of two different layers with j representing the higher layer; $\theta_j$ is a bias value for neuron j, and $w_{ji}$ represents the synaptic strength or weight of the connection between neuron i and neuron j. The output of neuron "j" is the result of applying the sigmoid-type threshold function corresponding to the neuron to the input received by the neuron from each neuron in the hidden layer. $o_j$ approaches 1 when the net input is positive ("on") while $o_j$ approaches 0 when the net input is negative ("off"). For each spectrum presented to the network, a single unique output layer should be turned "on" and all the others turned "off." The knowledge of the network is embedded in the values of the weights and biases, and teaching the network is reduced to finding a set of weights and biases that perform the required mapping of a set of input patterns onto a corresponding set of target output patterns.

A back propagation training scheme was used, that is, supervised training based on repeated presentation to the network of a set of learning patterns together with the desired output responses. At the beginning of a learning session, the weights and thresholds were initialized with random numbers. For each pattern presented, the error back-propagation rule defined a correction to the weights and thresholds, using a gradient descent method as described in chapter 8 of the Rumelhart reference cited above to minimize the square sum of the differences between target and actual outputs. The training proces was repeated iteratively until the difference between target and actual output fell below a predetermined specified level.

A total of 24 spectra were produced from the free induction decays (FIDs) of six sugar alditols, in which four sets of each spectrum were obtained at a different line width, level of noise, apodization, and/or baseline correction. The variation of noise level, line width, and baseline distortion represented differences commonly found in experimentally obtained $^1$H-NMR spectra. The 500-MHz $^1$H-NMR spectra of six sugar alditols were recorded at a concentration of 6 mg in 0.5 ml 99.98% $D_2O$, using acetone as an internal reference (2.2 ppm). The six FID's were recorded in 8K datapoints using a spectral width of 2500 Hz, which resulted in a digital resolution of 0.61 Hz per point. Eight scans were collected for each FID. From the six FID's, a total of 24 spectra were produced, as four sets of six spectra, each set having a different apodization and/or baseline correction. The spectra were transferred to an IBM PC, from the ASPECT 3000 computer of the Bruker AM 500 spectrometer which was used, via the SPECNET facility of the standard spectrometer software. The PC employed a conventional communication program and handled all subsequent data processing.

A reference learning set of 24 patterns was created, taking from each spectrum 400 datapoints in the range 4.0 to 3.5 ppm, at a fixed distance relative to the acetone line. The target output patterns were also included, and all patterns were normalized to have an integrated intensity proportional to the expected number of protons.

The spectra of the six alditols included in the learning set are shown in FIG. 2.

The network converged to the desired solution in less than 30 presentations of the 24 patterns. The presentation sequence was randomized, and for each pattern the weight corrections were applied only if the discrepancy between the actual and target output pattern exceeded the specified level of accuracy. This method enhanced the rate of convergence, presumably because the weights were allowed to adjust more freely for patterns not yet learned, while avoiding corrections for patterns already learned with sufficient accuracy. Each output layer neuron was required to have an output value of 0.9 in order to be "on" and a value of 0.1 to be "off." The computations required to learn the 24 spectra were not demanding; a typical learning session was completed in about 20 minutes, using a 6-MHz IBM PC AT with a math coprocessor.

Each of the six hidden layer neurons was connected to all of the input layer neurons, thus "seeing" the whole spectrum. As a result, the synaptic weights of the connections between each input layer and each hidden layer neuron were critical in determining which spectral features the network used to identify a particular alditol (although the synaptic weights of the hidden and output layer neurons obviously also played a part in such identification). Plots of the 400 synaptic weights for the input and hidden layer connections for each alditol, which correspond to the FIG. 2 spectra for the alditols, are shown in FIG. 3. The patterns clearly share common features with the alditol spectra shown in FIG. 2. The hidden layer neurons may thus be considered as detectors for specific spectral features, as for example, a combination of multiplets. The nature of the sigmoid-type neuron output equation is such that when spectral features of the spectrum coincide with similar features in the synaptic weight pattern, the hidden-layer neuron in question tends to turn "on." The output layer combines the partial evidence from the hidden layer feature detectors to perform the final identification of the individual spectra.

The training process was repeated approximately twelve times, using different sets of initial random weights. In all cases, the weight patterns that connect the hidden layer neurons to the input neurons showed similar recognizable features as presented in FIG. 3; i.e. subsets of the multiplets that form the original spectra. Thus, the characteristic signals of the individual spectra were represented in different weight traces. Experiments were also performed with networks having from three to ten neurons in the hidden layer. In each case, the network was able to learn. However, learning was very slow when there were only three hidden-layer neurons.

The neural network was tested for sensitivity to distortions in the learned alditol spectra. The learning set of 24 spectra was used to create four additional sets of 24 test spectra. The first such set was obtained by shifting each data point one increment left. The second set was obtained by shifting each data point one increment right. The third set included added Gaussian-distributed noise, and the fourth set was obtained by reducing the intensity by a factor of two. The Gaussian noise resulted in a reduction of the signal-to-noise ration of the strongest lines in the spectra from approximately 250:1 to 35:1.

The four sets of distorted test patterns were presented to the network which had been "trained" with the original set of 24 unadulterated spectra. The network correctly identified all of the left-shifted spectra of the first test set. Two of the patterns from the right-shifted second set failed to turn on the proper output neuron fully, but only by a margin of 0.01 from the required 0.9 value (0.9±0.1). The network correctly identified all noisy set three spectra. It failed, however, to identify correctly any of the spectra from the fourth set, instead showing intermediate output neuron values in the range 0.64 to 0.79. The network when trained with the four test sets (in addition to the original spectra) in a new training session, readily identified all four test sets of spectra correctly.

Example II

Figure 4:
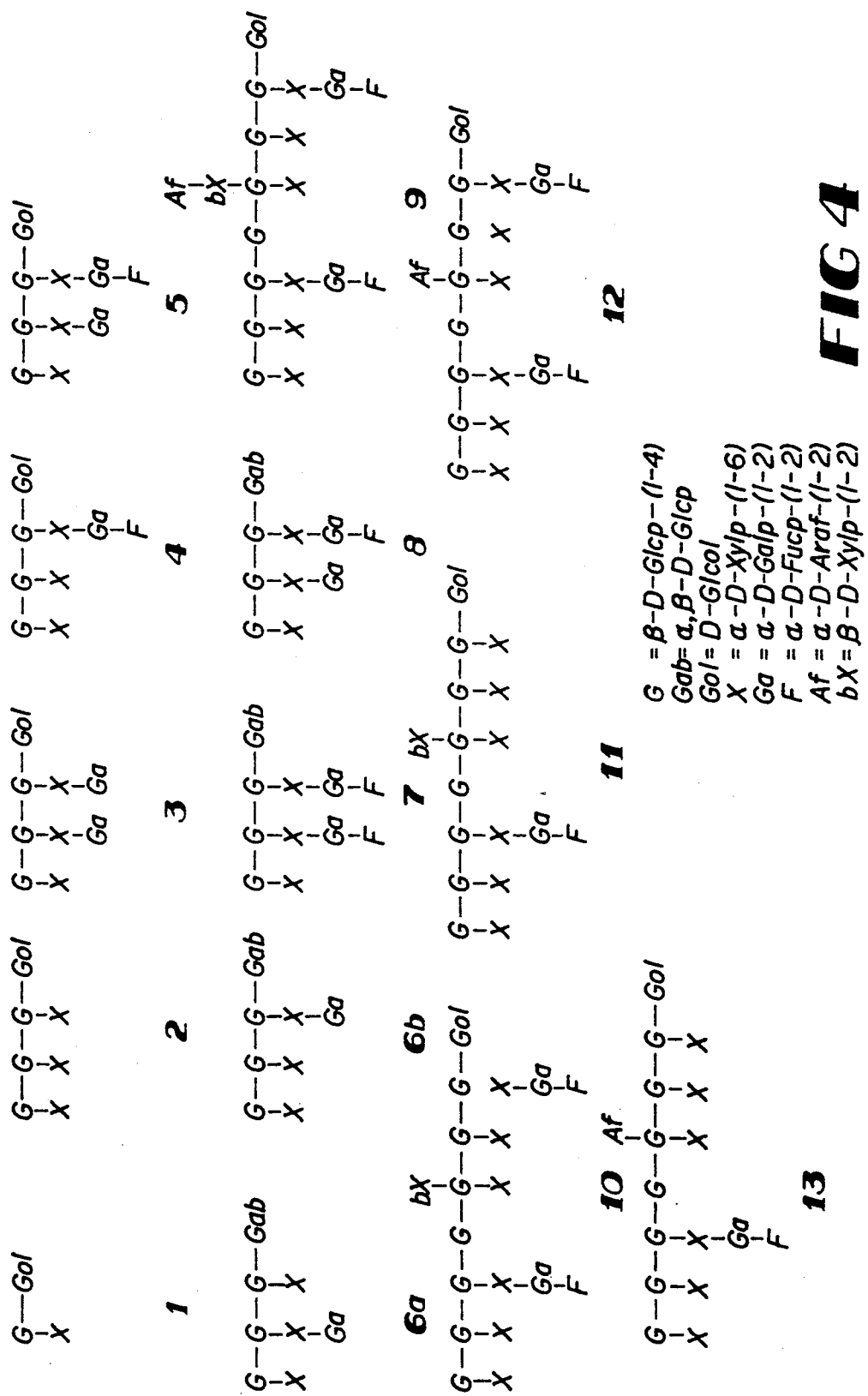
FIG. 4 shows structures of 13 complex oligosaccharides which were identified by neural networks according to the present invention as discussed in Example II.
Figure 5A:
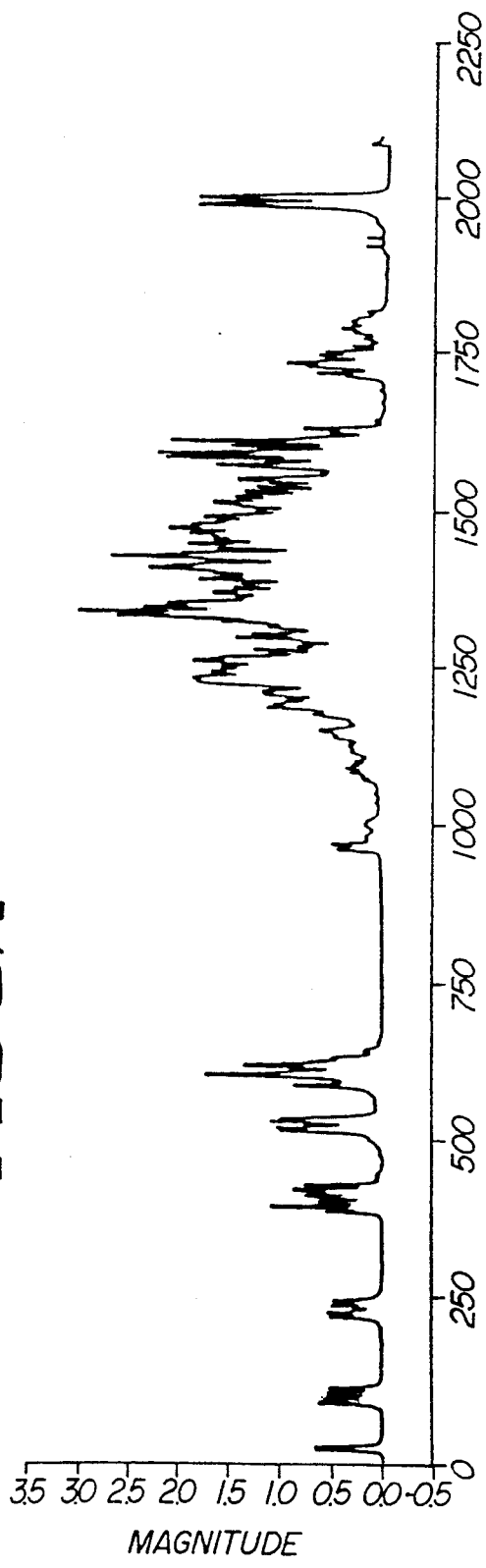
FIGS. 5A-5B shows input patterns generated from 500 MHz $^1$H-NMR spectra of structures 9 and 12, as illustrated in FIG. 4.
Figure 5B:
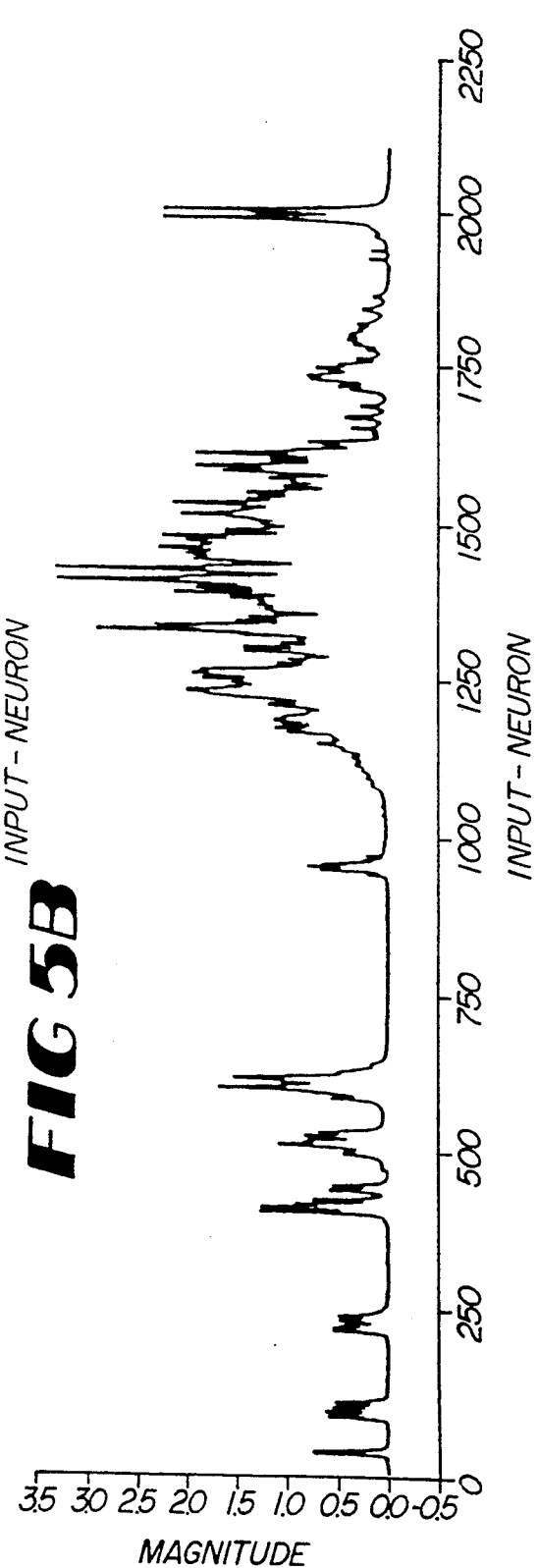

Complex oligosaccharides were analyzed using a large neural network. For purposes of this discussion, complex $^1$H-NMR spectra are defined as having only a small percentage of the signals separated into individually resolved NMR multiplets, i.e. most of the signals in the spectra are contained in a region of strong overlap, called the hump region (see FIG. 5). This kind of spectrum is typical for most biologically important molecules such as DNA, RNA, proteins, and complex oligosaccharides. All these molecules are composed of many closely related structures that give rise to very similar resonances in NMR spectra. NMR spectra of xyloglucans were chosen (FIG. 5) in order to explore the abilities of artificial neural networks to recognize these spectra. The molecules in the test set were composed of three to twenty glycosyl residues. A number of the residues in each xyloglucan oligosaccharide are identical, e.g. eight $\beta$-(1-4) linked glycosyl and six $\alpha$-(1-6) linked xylosyl residues in structures 10-13 as shown in FIG. 4. Thus, major portions of the NMR spectra of these compounds are determined by repetitive residues which lead to high degeneracies in the $^1$H-NMR spectra.

The 500 MHz $^1$H-NMR spectra of compounds 1-13 as shown in FIG. 4 were previously recorded without any idea that they would be analyzed by neural networks according to the present invention. Accordingly, no special care was taken or needed when recording the spectra for training the artificial neural network. The free induction decay (FID) files of these previously recorded spectra were retrieved from tape and processed in the following way: First, the FID files were Fourier transformed without any preprocessing. The resulting spectra were then normalized to a digital resolution of 0.5 Hz/point by interpolation of the spectral intensities. The chemical references of all spectra were also normalized to the same standard (acetone at 2.225 ppm). Three spectral regions from 1.15-1.34 ppm, 3.23-4.68 ppm and from 4.90-5.37 ppm covering all the signals in the $^1$H-NMR spectra of structures 1-13 as shown in FIG. 4 were extracted from the spectra and combined into patterns that were presented to the input neurons of the neural network (see FIG. 6). The total width of these combined regions was 1056 Hz. The residual water signal at 4.748 ppm was replaced by zeros to avoid problems with its greatly varying intensity and width. The signals within the spectra were normalized such that the intensities of all lines belonging to one selected hydrogen atom summed to 1. This process requires the identification within the spectra of only one peak that belonged to a signal with known multiplicity and which is not overlapped by other signals. Usually, one of the anomeric signals was chosen to scale the intensity of the spectra. This approach feeds, for all spectra, approximately the same relative intensity into the neural network. Previous work suggested that the networks are not particularly sensitive to changes in intensities, which implies that the use of peak integrals is not required for scaling purposes. Examples of the neural network input patterns that were obtained after the preprocessing of the $^1$H-NMR spectra are displayed in FIG. 6.

A standard feed forward-back propagation neural network as mentioned above and described in D. E. Rumelhart, et al., *Parallel Distributed Processing*, ch. 8 (MIT Press, 1986) was used for the analysis of the spectra of the 13 xyloglucan oligosaccharide structures. Several architectures of artificial neural networks were trained, which differed in the number of input, hidden layer and output neurons. The "on" state of an output neuron was defined to be any neuron with an activation of 0.9±0.1. Similarly, the "off" state of an output neuron was defined to be any neuron with an activation of 0.1±0.1. The neurons were considered to be in an undefined state with activation values between 0.2 and 0.8.

The initial training set containing the NMR spectra of oligosaccharides 1-13 was used to train a neural network with 2113 input, ten hidden layer and thirteen output neurons (NN-1). Each input neuron represented 0.5 Hz of the NMR spectral (total 1056 Hz). After training of the network, plots of the synaptic weight of input and hidden layer neuron connections were used to analyze the convergence properties of the network. A sample weight plot of such synaptic weights for one hidden layer neuron of NN-1 is shown in FIG. 7. It is apparent that both the anomeric region (from 4.47 to 5.37 ppm) and the hump region (from 3.23 to 4.21 ppm) contribute heavily to the recognition capabilities of the neural network. If the corresponding signals are present in the input patterns, positive weights increase the activation of hidden layer neurons whereas negative weights contribute to turning the hidden layer neurons off. Comparisons of all input layer-hidden layer connection synaptic weight plots for each hidden layer neuron with the actual spectra revealed that almost all signals in the original $^1$H-NMR spectra of structures 1-13 were utilized by the neural network to activate or to deactivate the hidden layer neurons.

$^1$H-NMR spectra of the same compound are no more reproducible than the data of other analytical techniques. It was expected that training the neural network with deliberately imperfect data would increase the ability of the neural network to correctly recognize spectra which inherently contain similar imperfections. In order to test this hypothesis, "fuzziness" (that is, minor variations in the input data) was introduced into the training set. This was accomplished by generating four additional copies of each spectrum. One copy contained the original spectrum with all signals shifted 0.5 Hz to the right, one 1.0 Hz to the right, one 0.5 Hz to the left and one 1.0 Hz to the left. Such procedures enable neural networks to be more tolerant of the minor changes in chemical shifts and line width that occur when spectra of the same molecule are obtained at different times or on different instruments. The initial training set of thirteen spectra was expanded to 65 by including the fuzzy spectra. This dataset was then used to train NN-1. Once again the neural network converged and was able to recognize the spectra of structures 1-13. The root mean square error of the trained neural network was 0.03 indicating an excellent agreement between target and actual output patterns.

The success of the structural reporter group concept demonstrates that signals whose chemical shifts are outside the poorly resolved hump region (~3.2 to 4.2 ppm) can be used to successfully recognize the spectra of a variety of oligosaccharides. The ability of neural networks to use only the structural reporter group signals on the one hand and only the hump region signals on the other hand in order to recognize spectra was accordingly tested. The $^1$H-NMR spectra of structures 1-5 was split into two sets. One set contained only the signals of the structural reporter groups of structures 1-5, that is, the regions from 4.47 to 5.37 ppm and from 1.15 to 1.35 ppm. The second set of partial spectra of structures 1-5 contained only the signals in the hump region, that is from 3.23 to 4.21 ppm. The spectral resolution was maintained at 0.5 $H_z$/input neuron. A neural network with 1003 input, 5 hidden, and 5 output neurons was used for the structural reporter group region, and a neural network with 981 input, 5 hidden, and 5 output neurons was used for the hump region. Even with only these partial data sets, both neural nets converged and were able to recognize each of the spectra. This was expected for the structural reporter group region; the result with the hump region was less intuitive and very instructive. This result strongly suggests that trained artificial neural networks can discriminate between spectra—even if trained with NMR spectral information that shows few, if any, evident differences to the human observer. Although it was not obvious that artificial neural networks could discriminate between the poorly resolved signals in the hump region, it is apparent that the hump region contains the information necessary to discriminate between oligosaccharides. The result means that the artificial neural network is better able to achieve this goal than humans.

It became evident from comparison of these network models to other network models with three (NN-2) or ten hidden (NN-3) layer neurons, respectively, that the 'signal to noise' ratio of the weight patterns as represented in FIG. 7 increased with decreasing number of hidden layer neurons, which can affect recognition stability and discrimination power of the neural networks.

This example thus establishes that a feedforward propagation artificial neural network is able to distinguish between the $^1$H-NMR spectra of oligosaccharides that differ by only one glycosyl residue out of 20. A neural network of the type described can thus form the core of a pattern recognition system to recognize $^1$H-NMR spectra. In contrast to traditional rule-based expert systems, neural networks discriminate between spectra without requiring the researcher to "hard-code" a set of rules. Teaching new spectra to the network involves adding the new spectra to the learning set and repeating the learning process. These results suggest that neural networks can be used to recognize the very complex $^1$H-NMR spectra of most if not all biologically interesting complex carbohydrates or other materials or compounds of interest.

Example III

Structure elucidation of a complex oligosaccharide structure normally begins with the determination of its glycosyl-residue and glycosyl-linkage composition. Analysis of the glycosyl-linkage pattern is made by comparison of the gas chromatographic retention times and electron impact mass spectra of the partially methylated alditol acetate derivatives (PMAAs) of the glycosyl residues. Glycosyl-linkage analysis involves the per-O-methylation of the oligosaccharide being analyzed, followed by hydrolytic cleavage of its glycosidic linkages in order to generate a mixture of partially methylated monosaccharides. The carbon atoms previously involved with other glycosyl residues or ring formation now carry hydroxy functions, while the carbon atoms in the original oligosaccharide that had free hydroxyl group now are substituted with O-methyl groups. Reduction of the partially methylated monosaccharides with sodium borodeuteride yields the corresponding alditols carrying a deuterium atom at the former aldehyde or keto function. Subsequent acetylation protects the unsubstituted hydroxy functions with O-acetyl groups.

Gas chromatographic separation of the resulting partially methylated alditol acetates (PMAA) followed by an electron impact mass spectrometric analysis of the individual PMAAs allows the location of the O-methyl and O-acetyl substituents to be ascertained. Discrimination between stereoisomers (e.g. glucitol, galactitol and mannitol) is achieved by comparison of GC retention times to those of known PMAA derivatives. In other words, the mass spectrum is used to identify the parent alditol without taking the stereochemistry into account and the gas chromatographic retention time is subsequently used to assign the stereochemistry of the molecule.

Chemical analysis of the glycosyl-residue and glycosyl-linkage has the advantage over NMR spectroscopic analysis in that a much smaller quantity (~10 ug compared to ~200 ug) of the oligosaccharide is needed. Such interpretation of the spectral data is not only costly in terms of the amount of sample required but is both complicated and time-consuming. This is true because the total number of different PMAA structures that can be obtained from one hexose is 64. Taking all different naturally occurring sugars into account, spectroscopists must determine from several thousand possible PMAA derivatives which molecule is present.

Accordingly, the mass spectra of PMAA derivatives of xylitol, arabinitol, rhamnitol and fucitol (see FIGS. 8 and 9) were used to test the ability of an artificial neural network to recognize the mass spectra obtained by combined GC-MS. An HP 5890 gas chromatograph with a 5970 mass selective detector was used for separation and quantitation of the compounds. The spectra were recorded and stored on an HP 9000 series 200 workstation. They were subsequently transferred to a DECstation 3100 for further processing. In order to use the spectra as input to the neural network, all data within each spectrum were normalized relative to the largest peak in the spectrum. Each mass to charge ratio was rounded to an integer number. Sets of network input patterns were then generated by mapping the normalized abundance for each mass number in a spectrum to the corresponding position of an input neuron. Spectra typical of those used in this study are shown in FIG. 9.

The neural network software used was the back propagation program of Rummelhart and McClelland, described in J. McClelland and D. E. Rumelhart, *Explorations in Parallel Distributed Processing* (MIT Press, 1988), which is incorporated herein by this reference. All the network models reported here consisted of an input layer of 400 neurons, a hidden layer of either 5, 15 or 25 neurons and an output layer of 22 neurons.

Figure 8:
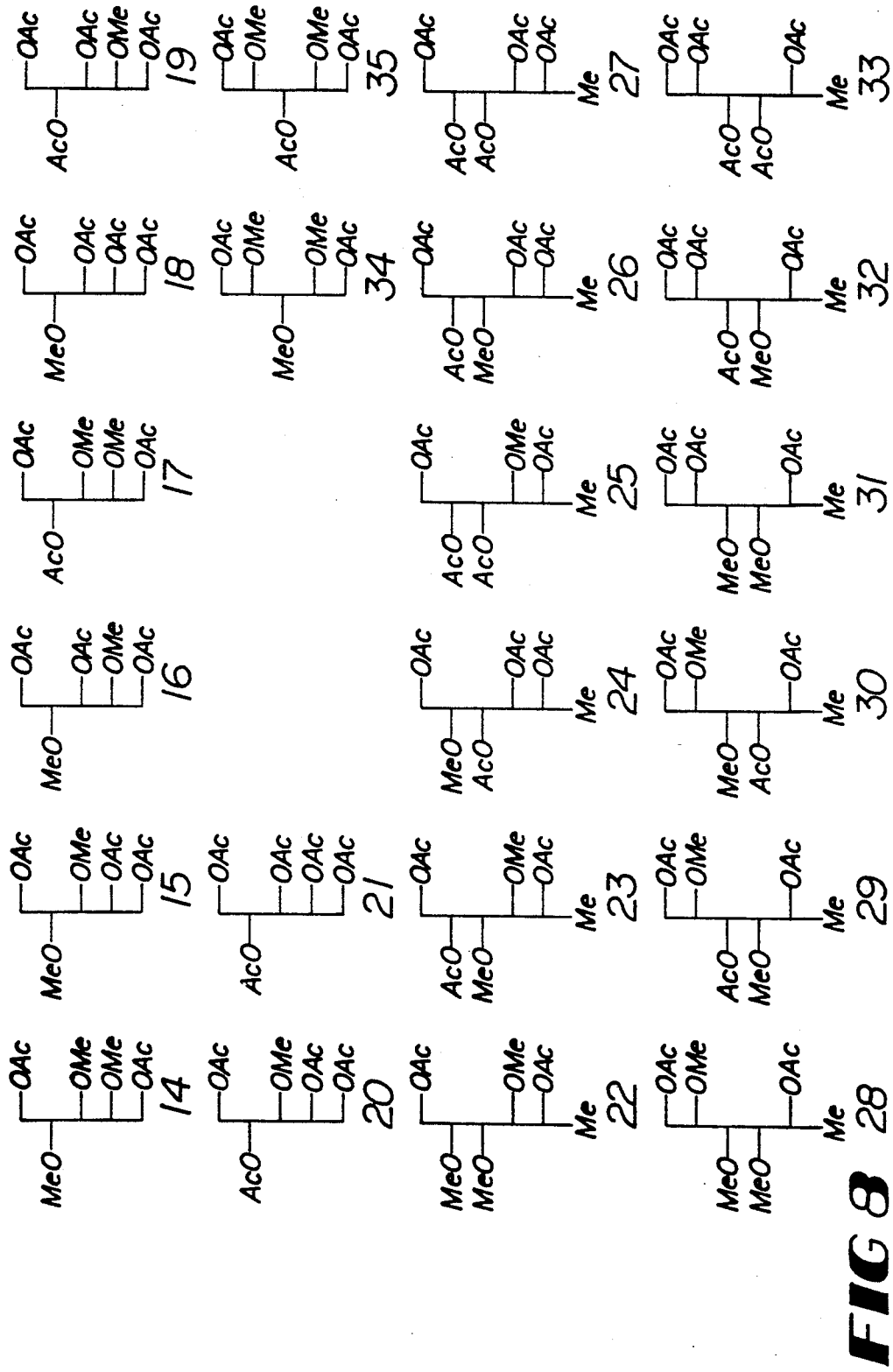
FIG. 8 shows structures of 22 partially methylated alditol acetates which were identified by neural networks according to the present invention as discussed in Example III.
Figure 10:
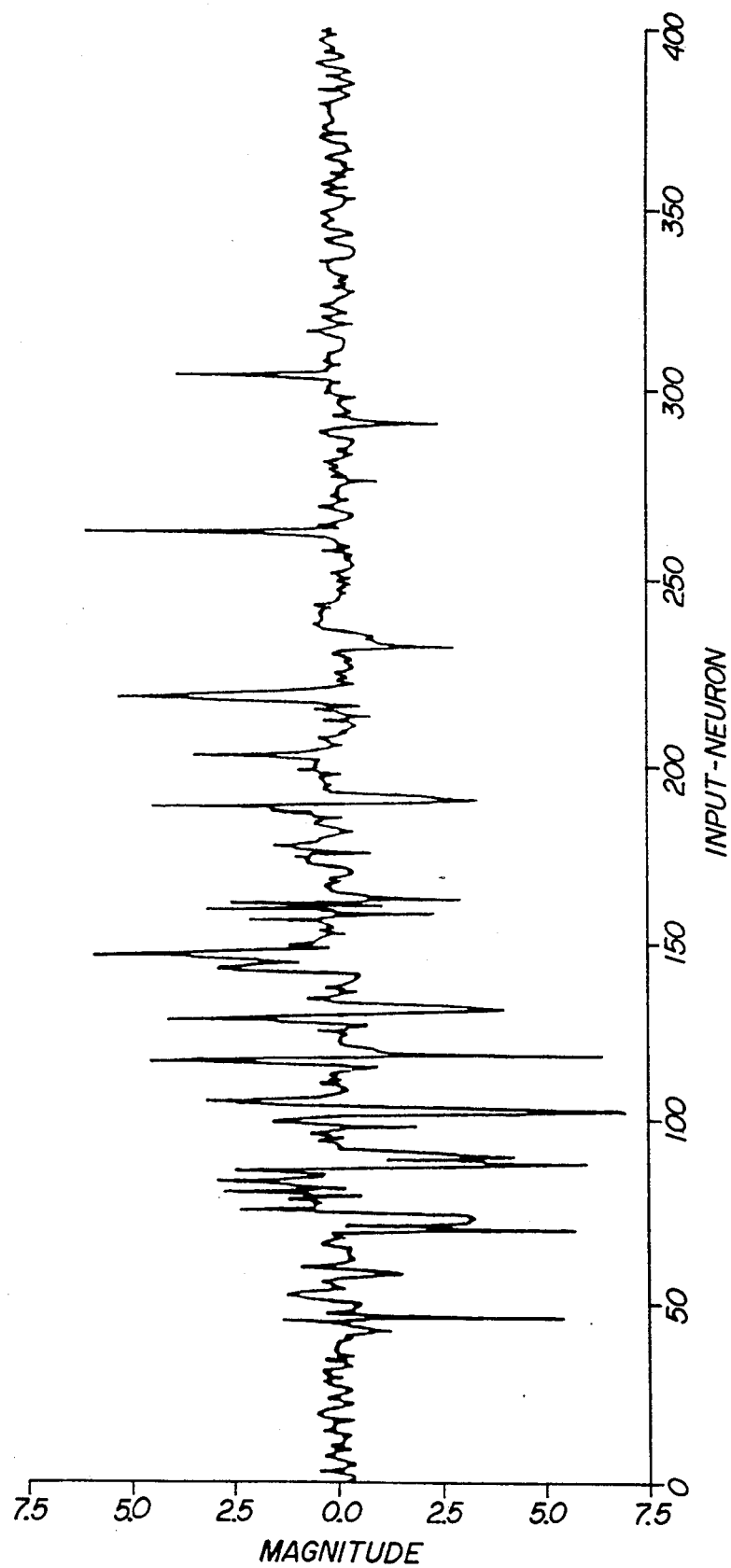
FIG. 10 shows a synaptic weight plot of the connections between input neurons and one hidden layer neuron of a neural network discussed in Example III.

An initial set of patterns with which to train the network was created by selecting the mass spectra of twenty-two well resolved peaks from the chromatographic data of four different PMAA mixtures. The structures of these molecules are shown in FIG. 8. This set included six pairs of epimeric molecules (e.g. compounds 14 & 34, 16 & 35, 22 & 28, 23 & 31, 25 & 32 and 27 & 33 of FIG. 8. Each chromatographic peak produced two to five MS spectra of the single PMAAs which resulted in a training set of 66 input patterns for the 22 different PMAAs. This training set was used successfully to train a network of 400 input neurons, 25 hidden neurons and 22 output neurons to recognize each of the 22 PMAAs including the epimeric pairs.

In order to increase the tolerance of the neural network to variations in the spectra, another training set was generated with variations in peak intensities deliberately included. This was accomplished by including copies of the original spectra where the copies differed from the original in that each peak in each spectrum was multiplied by a random factor ranging from 0.5 to 1.5. The network was successfully trained to recognize all 22 compounds in this set. When spectra that were omitted from the training set were presented to the trained network, eighteen of the twenty two compounds were recognized. The test spectrum for structure 14 activated its isomeric partner 34. When the spectrum from either structures 25 or 32, which are isomers, was presented, the network outputs for both 25 and 32 were partially activated. A single input pattern failed to cause correct identification of the proper molecule.

The ability to identify partially methylated alditol acetates as well as to discriminate between most of the stereoisomers from mass spectra demonstrates the powerful spectrum recognition and identification capabilities of artificial neural networks. These results show that neural networks can be trained to identify all naturally occurring partially methylated alditol acetates. While the above-described efforts have been focused on PMAAs, this neural network-based technique is readily adaptable to the mass spectra of other types of compounds. This approach can be generalized to provide researchers in different laboratories with the ability to build their own neural networks by forming training sets with their own mass spectra, training the neural network and these sets, and subsequently using the neural network to identify the mass spectra of molecules pertinent to their work. Additionally, the researcher would get answers from the neural networks almost instantaneously, as compared to longer library searches.

Discussion

Neural networks are clearly useful to recognize very complex spectra and to deal with variations occurring in experimental spectra while still maintaining the necessary discrimination between spectra. They also tolerate changes in chemical shifts of individual signals, changes in noise, and changes in line width and line shape.

Enhancing Pattern Recognition of NMR Spectra

In order to accomplish the foregoing tasks effectively, however, neural networks must be able to accommodate changes in several variables without affecting the recognition of the spectra. The variable parameters include the intensity of the spectrum (sample size), the digital resolution of the spectrum, the presence of solvent signals, the presence of signals from impurities (e.g. buffers), background noise, line width of the signals, and the presence of internal standards. The above-described examples show that neural networks can cope with at least some of these spectral variables: moderate variations in noise levels, chemical shifts, and intensities. Changes in absolute intensities may be handled by normalizing the spectra before they are presented to the neural network. Difficulties with S/N ratios can be minimized by including noise in the neural network's training set. The tolerance of the neural network to the presence of solvent signals of varying intensity or residual signals from buffers is less certain. One way to circumvent this problem will be for users to delete solvent signals from the original spectrum before presenting that spectrum to the trained neural network. A similar approach may be needed in order to solve problems with residual signals from buffers. In situations where elimination of solvent and impurity peaks involves the removal of a signal that is part of the target molecule, the result may be reduced ability of the neural network to recognize the spectrum. However, this will be minimized by inclusion of the spectrum without the solvent or impurity signals in the training set.

The presence of different internal standards in experimental spectra and variations in digital resolution, that is the frequency difference of successive points in the experimental spectrum, must be solved in other ways. The difficulties arising from use of different internal standards may be addressed by using a recently published approach that creates translationally invariant neural networks. See, A. Fuchs and H. Haken, 60 Biol. Cybern 107 (1988). With this type of neural network the input pattern does not have to be presented to the same neurons but can be recognized at different input layer positions. Different digital resolutions of spectra can be addressed by establishing a standard for the data presented to the network; all spectra that were not recorded at the standard resolution can be easily preprocessed using an interpolation algorithm to generate the standard resolution. This technique was in fact used to normalize complex $^1$H-NMR spectra to a digital resolution of 0.5 Hz in preliminary studies.

Reduction of Data Amount for Input into the Neural Network

Various techniques may be employed to reduce the amount of data required by neural networks in order to recognize complex oligosaccharides. As an example, the input layer of such a network must presently cover the spectral range extending from ~0.5 to ~8.0 ppm, that is, a range of 3750 Hz in a 500-MHz NMR spectrum. If the spectrum is fed to the network at its normal digital resolution of about 0.2 Hz per point, a large number of input neurons (22,500) would be required. This would require more processing to update the weights and thresholds than with the 2113 input neurons we have been using. Additionally, the number of hidden layer neurons would need to be increased in order to cover a large number of possible spectra to be recognized. Since the processing time for one training cycle is approximately proportional to the product of input and hidden layer neurons, even if the spectral resolution were reduced to 0.5 Hz/neuron, 7500 input neurons would be required in order to cover the spectral range of interest.

A promising alternative approach is to use the network to analyze free induction decays ("FIDs") rather than transformed spectra. FIDs contain the same information as transformed spectra. The advantage of using FIDs rather than transformed spectra is that an FID can easily be converted to the desired number of inputs without losing information from the spectrum. Again, different digital resolutions could be normalized by interpolation of the data points. Using the FIDs as the training set for the neural network may avoid some of the problems addressed above (e.g., digital resolution, shifted spectra due to different internal references), but other problems arise. An FID is composed of decaying cosine frequencies that result in spectral lines after Fourier transformation. The observed frequency is the difference between the actual resonance frequency of that nucleus and an internal carrier frequency. Thus, if two spectra of the same compound are recorded with different carrier frequencies, the FID's are completely different. The carrier frequency varies for spectra obtained on different instruments or even by different operators on the same instrument. This problem may be addressed by using a spectral preprocessing algorithm that involves (i) a complex forward-Fourier transformation, (ii) correction of the offset in the transformed spectrum by shifting the spectrum, and (iii) an inverse Fourier transformation to regenerate the FID with a normalized carrier frequency. Using a combination of transformed spectra and FIDs as the input to the neural network could prove to be more powerful than using either of these data separately.

Most complex carbohydrate $^1$H-NMR spectra are recorded on a 500 MHz instrument. Different spectrometer frequencies impose a problem for the neural network analysis. The pattern of most peaks within the $^1$H-NMR spectra do not change from one carrier frequency to another. However, the distance between these subpatterns does vary and consequently, this changes the appearance of the spectra. One alternative is obviously to design the neural network to handle only spectra recorded at one frequency, such as 500 MHz, as comparing spectra recorded at other frequencies will complicate the analysis. The problem of different spectrometric carrier frequencies could be overcome by training the network to recognize the subpatterns of individual H-atoms, e.g., singlets, doubles, triplets, or doublet-doublet multiplets. In other words, the network may recognize the multiplicity of signals which is the most detailed feature of a spectrum. The composition and location of the subpatterns could then define the chemical structure. For example, the neural network may be able to be taught with just the isolated multiplet structures found in oligosaccharides before proceeding to the teaching of monosaccharides and oligosaccharides. This approach, if successful, would eliminate having a separate neural network for each spectrometer frequency. Such networks may require more than one hidden layer to handle the individual steps required for detection of multiple features, however. This approach could also provide substructure information from the interpretation of the neural networks even in cases where the presented structure does not exactly match the information stored in the neural network.

Oligosaccharide structures form families of molecules. Functionally-related molecules often vary in only a few residues. Neural networks may also be able to recognize the glycosyl residues that make up an oligosaccharide. This would imply that, even if the structure currently presented to the neural network is not contained in the knowledge base, the neural network would be able to assign the glycosyl residues in the oligosaccharide. A way to "prime" the neural network with substructure information could be derived by using spectra of substructures extracted from the spectra of higher oligosaccharides as starting weight values rather than randomizing the initial weight set. The number of substructures would represent a much smaller dataset than the complex structures. One way to test this "priming" of the neural network is by using the subspectra of all component glycosyl residues with certain linkage patterns. These subspectra can be extracted from the total spectrum by using 1-D or 2-D HOHAHA spectra which, upon irradiation of one signal of one subunit, deliver all the signals within that subunit as a separate trace. Initializing the weights with these subspectra would result in the activation of the hidden layer neurons connected to this pattern whenever this subunit is present. A neural network with this feature may have two hidden layers where one hidden layer represents the substructure information.

A neural network that can recognize the individual building blocks (glycosyl residues) of all oligo- and polysaccharides could inform the researcher of the probable glycosyl and non-glycosyl compositions of the unknown spectrum with the spectral knowledge base of the neural network. No other rapid analytical procedure can simultaneously provide the glycosyl composition and anomeric configurations.

Additionally, networks according to the present invention may be used to generate information that is useful to indicate and identify materials whose spectra have not been included in the training set, by indicating close relatives of the material. For example, referring to FIG. 11, presenting the spectrum of the mixture of the molecules T1 and T2 shown at the bottom of that figure to the neural network described in Example 2 above, yielded partial activation (activation levels between 0.2 and 0.8) of compounds 2, 3, 4, 6a and 6b. Each of those structures deviates only in one glycosyl residue from the mixture of tested structures T1 and T2.

Other Network Architectures

The neural network schemes described above represent supervised learning, because the manager of the neural network must define the response of the output layer for each spectrum in the training dataset. In other neural network schemes, like the Adaptive Resonance Theory of Grossberg discussed above and in G. A. Carpenter and S. Grossberg, 37 *Computer Vision, Graphics and Image Processing* 54–115 (1987), the architecture of the network is pre-defined, but the output is not set to a pre-defined value.

Data Modification For Enhanced Performance

A neural network's tolerance to spectral data variations and anomalies and thus its performance can be enhanced by manipulating the original FIDs of the recorded spectra. Tolerance to variations in line widths, S/N ratios, and chemical shifts can be obtained by mathematically modifying the original data. Line width can be modified by changing the decay rate of the FID. S/N ratio can be changed by adding white noise to the FID. Chemical shifts can be changed by shifting the transformed spectrum left and right. Presenting such an increased set of spectra to the network in a learning session will improve its ability to deal with these variations.

Signal overlap in the hump region of the spectrum increases as the complexity of the molecule increases. In order to get a satisfactory level of discrimination between closely related structures, resolution-enhanced spectra may prove to be necessary for neural network analysis. The difference between normal and resolution enhanced spectra will not be important in the regions of spectra where the well-defined signals of the structural reporter groups are contained. However, if the complex hump region of the spectrum can be resolved into individual lines, the spectrum may be more easily recognized by a neural network.

Performance

Neural networks have the advantage of being able to quickly compare (less than 0.5 sec) a newly recorded spectrum to the information contained in the training set of the network. Thus, a routine user would rapidly receive answers to queries of the knowledge base contained in the neural network. The training procedure consumes more time, but that is not a problem for the user, as any new information added to the neural network is handled by one person, and new spectra could be added in a net training session during "off-hours". It is likely to be effective to divide the neural networks into sets of spectra representing different types of complex carbohydrates, i.e., glycoproteins, glycolipids, glycosaminoglycans, bacterial polysaccharides, fungal polysaccharides, plant cell wall polysaccharides, and so forth. Each sub-network would have its own associated neural network, each of which could analyze its respective knowledge base more accurately than one network could store the information of all combined datasets. The user would always know the source and type of molecule he/she is tryinq to match and could check against any of the neural networks when required.

Recognition Of Two-Dimensional Data

Neural networks also appear to be useful in analyzing 2-D NMR spectra; such analysis is useful because it can be of great value in cases where the neural network of the 1-D spectra will not be able to give an unambiguous answer. Although 2-D spectra have the advantage of greater dispersion of the spectral information, that is, into two dimensions, they require about tenfold more sample to record, and sample size is often limited in biological samples. The same neural network concepts described for 1-D spectra may be used to interpret 2-D NMR spectra, but the input layer is extended into two dimensions. Standard COSY spectra recorded in magnitude mode may be employed so that all of the NMR signals have positive values. The network may also be used to recognize phase sensitive COSY spectra. This requires a different set of weights and thresholds in the neural network, because the network must accommodate both positive- and negative-intensity information in a 2-D contour map. Use of a neural network in this application is analogous in many senses to use of neural networks to recognize subpatterns of a photograph that had different positions within the picture. See, e.g., A. Fuchs and H. Haken, 60 Biol. Cybern. 17, 107 (1988).

Neural Network-based Pattern-Recognition of Mass Spectra

It has been discussed above that artificial neural networks can be used successfully to recognize the mass spectra of partially methylated acetylated alditols. Their efficiency in recognizing PMAAs may be enhanced in several ways. Including the gas chromatographic retention time in the data presented to the input neurons is one way of improving the precision of recognition. Two different possibilities for the implementation of the GC retention times in the neural network exist. A set of input neurons that represents both the mass spectrum and the GC can be fully connected to the all hidden layer neurons. With this approach the GC retention time data influences the neural network output approximately as much as any of the mass spectrometric fragment peaks. If this is too little emphasis for the GC retention time, another option is to connect the GC related input neurons to a separate set of hidden layer neurons and connect all hidden neurons fully to the output neurons. The latter approach assures that the GC data influences the recognition of the spectra as much as the combined effect of the MS fragment peaks. The implementation of the GC data into the neural network requires the standardization of the retention times. This may be accomplished by adding a set of five standards to each GC-MS analysis. Interpolation of the retention times of the peaks between pairs of the standards provides the normalized retention times for input into the neural network.

Normally, the mass spectra of PMAAs are interpreted to determine the substitution pattern of O-methyl and O-acetyl groups but not their stereochemistry. The training set of 22 PMAAs discussed above contains six pairs of epimers. Each pair of epimers has an identical substitution pattern. From these six pairs the neural network correctly identified the stereochemistry of four pairs. One epimeric pair (25 & 32) gave partial activation of the pair's associated output neurons when the spectrum of either 25 or 32 was presented to the neural network. Thus, one can differentiate between most of the identically substituted stereoisomers but not all. Comparison of the mass spectra of identically substituted stereoisomers shows that the use of intensity can be important in order to fully distinguish between them. The solution seems not to be the interpretation of the intensity ratios of one or two pairs of peaks but the intensity ratios of the majority of the peaks. However, work on recognizing $^1$H-NMR spectra suggests that neural networks are not very sensitive to changes in intensity. In order to enhance recognition of intensity differences, a different neural network may be used that has a two dimensional input. One dimension represents the mass unit of the ion and the second dimension containing several neurons per mass unit represents the intensity of the peak. Each intensity unit will represent a certain threshold for the normalized intensity and will be turned on if the intensity of the peak is higher than the threshold. This should cause the neural network to be more sensitive to the intensity of the peaks.

Another way to enhance the ability of the neural network to discriminate different stereoisomers without adding another input dimension to the neural network is to use highly standardized input data. Implementation of a two step process, each of which would be based on a neural network, may achieve the goal. The first step can reveal, by partial activation of the target output neurons, that a stereoisomer problem exists, which would have to be examined in greater detail in a second step of neural network analysis. The second step makes use of auto-associative neural networks which are capable of restoring a partially distorted pattern according to the training set that is included in the weights and thresholds of this kind of network. Thus, each stereoisomer can have its own auto-associative neural network. Activation of the output tells the scientist that this neural network is recognizing the input pattern as being its target pattern and thus assign the stereochemistry of this PMAA. As an example, eight separate auto-associative neural networks are needed to find which stereoisomer is present for hexitols.

Neural networks capable of interpreting GC-MS data have broad applications including metabolite studies, environmental trace analyses, and assays of biological samples. The advantage of using a neural network for the analysis of data rather than a library search is the ease with which the neural network can be tailored to the needs of the researcher and the speed with which the knowledge base of the neural network will give an answer. Furthermore, it does not rely on human definition of deviations within the data from one experiment to the next but incorporates these differences from the training set.

The foregoing discussion is provided for purposes of illustration and explanation of embodiments of the present invention, including a preferred embodiment. The above examples, which discuss the use of neural networks to identify complex carbohydrate molecules from their spectra, show the principles that allow such identification of any material or structure from which a spectrum or spectra can be obtained that can be applied to a neural network. Accordingly, the foregoing discussion is not intended to be limiting in nature, and it will be apparent that uses of various types of neural networks (whether one or more, and whether embedded in software, hardware or a combination), various types of spectra (whether NMR, IR, GC, MS or other), and identification of any conceivable type of material from which a representative spectrum can be obtained, fall within the scope and spirit of the invention.

What is claimed is:

1. Apparatus for analyzing and identifying the structure of a particular organic material by recognizing patterns of information that are characteristic of such materials, the apparatus comprising:
   (a) analytical means for applying energy to the organic material under analysis, sensing transformations in the energy imparted by the material, and producing therefrom spectral information corresponding to the energy transformations and the structure of the material;
   (b) means for digitizing a plurality of incremental portions of the spectral information into digital data; and
   (c) off-line neural network means for utilizing the digital data to identify the structure of the organic material under analysis, comprising;
      (i) an input layer comprising a plurality of input nodes, each of which nodes receives the digital data;
      (ii) an output layer hierarchically lower than the input layer comprising a plurality of output nodes, for indicating and identifying the structure of the material under analysis;
      (iii) a plurality of synaptic connections, each of which connects a node in a hierarchically higher layer to a plurality of nodes in a hierarchically lower layer and each of which features a synaptic strength value which has been generated during a back-propagation learning process using spectral data from organic materials analogous to the organic material under analysis; and
      (iv) each of the nodes featuring a threshold value which has been generated during a back-propagation learning process using spectral data from organic materials analogous to the organic material under analysis.

2. Apparatus according to claim 1 in which each node of the output layer corresponds to an organic material.

3. Apparatus according to claim 1 comprising at least one hidden layer hierarchically intermediate the input and output layers and comprising a plurality of hidden nodes.

4. Apparatus according to claim 1 in which the neural network means is in the form of at least one computer program.

5. Apparatus according to claim 1 in which the nodes are implemented in computer hardware.

6. Apparatus according to claim 1 in which each of the output nodes corresponds to a carbohydrate molecule.

7. Apparatus according to claim 1 in which the off-line neural network means is a forward-feed neural network having a single hidden layer of hidden nodes.

8. Apparatus for analyzing and identifying the structure of a particular organic material by recognizing patterns of information that are characteristic of such materials, the apparatus comprising:
   (a) analytical means for applying energy to the organic material under analysis, sensing transformations in the energy imparted by the material, and producing therefrom spectral information corresponding to the energy transformations and the structure of the material;
   (b) means for digitizing a plurality of incremental portions of the spectral information into digital data; and
   (c) off-line neural network means for utilizing the digital data to identify the structure of the organic material under analysis, comprising:
      (i) an input layer comprising a plurality of input nodes, each of which nodes receives the digital data;
      (ii) an output layer hierarchically lower than the input layer comprising a plurality of output nodes, for indicating and identifying the structure of the material under analysis;
      (iii) at least one hidden layer hierarchically intermediate the input and output layers comprising a plurality of hidden nodes;
      (iv) a plurality of synaptic connections, each of which connects a node in a hierarchically higher layer to a plurality of nodes in a hierarchically lower layer and each of which features a synaptic strength value which has been generated during a back-propagation learning process using spectral data from organic materials analogous to the organic material under analysis; and
      (v) each of the nodes featuring a threshold value which has been generated during a back propagation learning process using spectral data from organic materials analogous to the organic material under analysis.

9. Apparatus according to claim 8 in which each node of the output layer corresponds to an organic material.

10. Apparatus according to claim 8 comprising a plurality of hidden layers of hidden nodes.

11. Apparatus according to claim 8 in which the off-line neural network means is in the form of at least one computer program.

12. Apparatus according to claim 8 in which the nodes are implemented in computer hardware.

13. Apparatus according to claim 8 in which each of the output nodes corresponds to a carbohydrate molecule.

14. Apparatus according to claim 8 in which the off-line neural network means is a forward-feed neural network having a single hidden layer of hidden nodes.

15. Apparatus for analyzing and identifying the structure of a particular organic material by recognizing patterns in spectra that are characteristic of such materials, the apparatus comprising:
   (a) spectroscopy analytical means for applying radiation energy to the organic material under analysis, sensing transformations in the energy imparted by the material, and producing therefrom spectral information corresponding to the energy transformations and the structure of the material;
   (b) means for digitizing a plurality of incremental portions of the spectral information into digital data; and
   (c) off-line neural network means for utilizing the spectral information to identify the structure of the organic material under analysis, comprising:
      (i) an input layer comprising a plurality of input nodes, each of which nodes receives digital data corresponding to an incremental portion of the spectral information;
      (ii) an output layer hierarchically lower than the input layer comprising a plurality of output nodes, for indicating and identifying the structure of the material under analysis;
      (iii) at least one hidden layer hierarchically intermediate the input and output layers comprising a plurality of hidden nodes;
      (iv) a plurality of synaptic connections, each of which connects a node in a hierarchically higher layer to a plurality of nodes in a hierarchically lower layer and each of which features a synaptic strength value which has been generated during a back-propagation learning process using spectral data from organic materials analogous to the organic material under analysis; and
      (v) each of the nodes feature a threshold value which has been generated during a back propagation learning process using spectral data from organic materials analogous to the organic material under analysis.

16. Apparatus according to claim 15 in which each node of the output layer corresponds to an organic material.

17. Apparatus according to claim 15 in which the material under analysis is a carbohydrate molecule and each output node corresponds to a carbohydrate molecule.

18. Apparatus according to claim 15 in which the spectroscopy analytical means is a nuclear magnetic resonance spectroscopy device.

19. Apparatus according to claim 15 in which the spectroscopy analytical means is an infrared absorption spectroscopy device.

20. Apparatus according to claim 15 in which the spectroscopy analytical means is an x-ray analysis device.

21. Apparatus according to claim 15 in which the spectroscopy analytical means is a mass spectrometer.

22. Apparatus according to claim 15 in which the spectroscopy analytical means is a gas chromatograph.

23. Apparatus according to claim 15 in which the spectroscopy analytical means is ultraviolet spectroscopy.

24. Apparatus for analyzing and identifying the structure of a particular carbohydrate material by recognizing patterns in spectra that are characteristic of such materials, the apparatus comprising:
   (a) magnetic resonance analytical means for subjecting the carbohydrate material under analysis to a magnetic field and radio-frequency radiation, and producing spectral information corresponding to the absorption of the radiation and the structure of the material;
   (b) means for digitizing a plurality of incremental portions of the spectral information into digital data; and
   (c) off-line neural network means for utilizing the spectral information to identify the structure of the material under analysis, comprising:
      (i) an input layer comprising a plurality of input nodes, each of which nodes receives digital data corresponding to an incremental portion of the spectral information;
      (ii) an output layer hierarchically lower than the input layer comprising a plurality of output nodes, for indicating and identifying the structure of the material under analysis;
      (iii) at least one hidden layer hierarchically intermediate the input and output layers comprising a plurality of hidden nodes;
      (iv) a plurality of synaptic connections, each of which connects a node in a hierarchically higher layer to a plurality of nodes in a hierarchically lower layer and each of which features a synaptic strength value which has been generated during a back-propagation learning process using spectral data from carbohydrate materials analogous to the material under analysis; and
      (v) each of the nodes featuring a threshold value which has been generated during a back propagation learning process using spectral data from carbohydrate materials analogous to the material under analysis.

25. A method for analyzing and identifying the structure of a particular organic material by recognizing patterns in spectra that are characteristic of such materials, comprising the steps of:
   (a) subjecting an organic material under analysis to energy in an analytical means;
   (b) sensing transformations in the energy imparted by the material;
   (c) producing spectral information corresponding to the energy transformations and the structure of the material;
   (d) digitizing a plurality of incremental portions of the spectral information;
   (e) supplying at least one off-line neural network which comprises:
      (i) an input layer comprising a plurality of input nodes, each of which is capable of receiving digital data corresponding to an incremental portion of the spectral information;
      (ii) an output layer hierarchically lower than the input layer comprising a plurality of output nodes, for indicating and identifying the structure of the material under analysis;

(iii) a plurality of synaptic connections, each of which connects a node in a hierarchically higher layer to a plurality of nodes in a hierarchically lower layer; and each of which features a synaptic strength value which has been generated during a back-propagation learning process using spectral data from organic materials analogous to the organic material under analysis; and (iv) each of the nodes featuring a threshold value which has been generated during a back propagation learning process using spectral data from organic materials analogous to the organic material under analysis and (f) applying the digital data corresponding to incremental portions of the spectral information relating to the material under analysis to the input nodes of the neural network in order to generate at the output nodes information that is useful to indicate and identify the structure of the material under analysis.

26. A method according to claim 25 in which the step of supplying at least one off-line neural network comprises supplying at least one off-line neural network which includes at least one hidden layer hierarchically intermediate the input and output layers comprising a plurality of hidden nodes.

27. A method according to claim 25 in which the steps of subjecting the material under analysis to energy in a spectroscopy analytical means, sensing transformations in the energy imparted by the material and producing spectral information corresponding to the energy transformations and the structure of the material are performed using a nuclear magnetic resonance spectroscopy device.

28. A method according to claim 25 in which the steps of subjecting the material under analysis to energy in a spectroscopy analytical means, sensing transformations in the energy imparted by the material and producing spectral information corresponding to the energy transformations and the structure of the material are performed using an infrared absorption spectroscopy device.

29. A method according to claim 25 in which the steps of subjecting the material under analysis to energy in a spectroscopy analytical means, sensing transformations in the energy imparted by the material and producing spectral information corresponding to the energy transformations and the structure of the material are performed using an x-ray analysis device.

30. A method according to claim 25 in which the steps of subjecting the material under analysis to energy in a spectroscopy analytical means, sensing transformations in the energy imparted by the material and producing spectral information corresponding to the energy transformations and the structure of the material are performed using a mass spectrometer.

31. A method according to claim 25 in which the steps of subjecting the material under analysis to energy in a spectroscopy analytical means, sensing transformations in the energy imparted by the material and producing spectral information corresponding to the energy transformations and the structure of the material are performed using a gas chromatography device.

32. A method according to claim 25 in which the steps of subjecting the material under analysis to energy in a spectroscopy analytical means, sensing transformations in the energy imparted by the material and producing spectral information corresponding to the energy transformations and the structure of the material are performed using an ultraviolet spectroscopy device.

33. A method according to claim 25 in which the generated information indicates the material under analysis.

34. A method according to claim 25 in which the generated information indicates portions of the material under analysis.

35. A method for analyzing and identifying the structure of a particular carbohydrate material by recognizing patterns in spectra that are characteristic of such materials, comprising the steps of:

(a) subjecting a carbohydrate material under analysis to energy in a spectroscopy analytical means;

(b) sensing transformations in the energy imparted by the material;

(c) producing spectral information corresponding to the energy transformations and the structure of the material;

(d) selecting portions of the spectral information which are desired for use in identifying the structure of the material;

(e) digitizing a plurality of incremental portions of the selected spectral information;

(f) supplying at least one off-line neural network which comprises:

(i) an input layer comprising a plurality of input nodes, each of which is capable of receiving digital data corresponding to an incremental portion of the spectral information;

(ii) an output layer hierarchically lower than the input layer comprising a plurality of output nodes, for indicating and identifying the structure of the material under analysis;

(iii) at least one hidden layer hierarchically intermediate the input and output layers comprising a plurality of hidden nodes;

(iv) a plurality of synaptic connections, each of which connects a node in a hierarchically higher layer to a plurality of nodes in a hierarchically lower layer; and each of which features a synaptic strength value which has been generated during a back-propagation learning process using spectral data from carbohydrate materials analogous to the carbohydrate material under analysis; and (v) each of the nodes featuring a threshold value which has been generated during a back propagation learning process using spectral data from carbohydrate materials analogous to the carbohydrate material under analysis; and (g) applying the digital data corresponding to incremental portions of the spectral information relating to the material under analysis to the input nodes of the neural network in order to generate at the output nodes information that is useful to indicate and identify the structure of the material under analysis.

36. A method according to claim 35 in which the step of supplying at least one off-line neural network comprises supplying at least one feed forward off-line neural network.

37. A method according to claim 35 in which the steps of subjecting the material under analysis to energy in a spectroscopy analytical means, sensing transformations in the energy imparted by the material and producing spectral information corresponding to the energy transformations and the structure of the material are performed using a nuclear magnetic resonance spectroscopy device.

38. A method according to claim 35 further comprising the step of deselecting undesired spectral information that corresponds to impurities in the material.

39. A method according to claim 35 further comprising the step of normalizing the spectral information with respect to a predetermined point in the spectrum.

40. A method according to claim 35 in which the generated information indicates the material under analysis.

41. A method according to claim 35 in which the generated information indicates portions of the material under analysis.

42. A method for analyzing and identifying the structure of a particular organic material by recognizing patterns in free induction decay information that are characteristic of such materials, comprising the steps of:
   (a) subjecting the organic material under analysis to energy in a nuclear magnetic resonance device;
   (b) sensing transformations in the energy imparted by the material;
   (c) producing free induction decay information corresponding to the energy transformations and the structure of the material;
   (d) selecting portions of the free induction decay information which are desired for use in identifying the material;
   (e) digitizing a plurality of incremental portions of the selected free induction decay information;
   (f) supplying an off-line neural network which comprises:
      (i) an input layer comprising a plurality of input nodes, each of which is capable of receiving digital data corresponding to an incremental portion of the free induction decay information;
      (ii) an output layer hierarchically lower than the input layer comprising a plurality of output nodes, for indicating and identifying the structure of the material under analysis;
      (iii) a plurality of synaptic connections, each of which connects a node in a hierarchically higher layer to a plurality of nodes in a hierarchically lower layer; and each of which features a synaptic strength value which has been generated during a back-propagation learning process using spectral data from organic materials analogous to the organic material under analysis; and
      (iv) each of the nodes featuring a threshold value which has been generated during a back propagation learning process using spectral data from organic materials analogous to the organic material under analysis; and
   (g) applying the digital data corresponding to incremental portions of the free induction decay information relating to the material to the input nodes of the off-line neural network in order to generate at the output nodes information that is useful to indicate and identify the structure of the material under analysis.

43. A method according to claim 42 in which the step of supplying at least one off-line neural network comprises supplying at least one off-line neural network which includes at least one hidden layer hierarchically intermediate the input and output layers comprising a plurality of hidden nodes.

44. A method for analyzing and identifying the structure of a particular organic material by recognizing patterns in spectral information that are characteristic of such materials, comprising the steps of:
   (a) subjecting the organic material under analysis to energy in at least two analytical means;
   (b) sensing transformations in the energy imparted by the material;
   (c) producing spectral information corresponding to the energy transformations and the structure of the material;
   (d) selecting portions of the spectral information which are desired for use in identifying the material;
   (e) digitizing a plurality of incremental portions of the selected spectral information;
   (f) supplying at least one off-line neural network which comprises:
      (i) at least one input layer comprising a plurality of input nodes, each of which is capable of receiving digital data corresponding to an incremental portion of the spectral information;
      (ii) an output layer hierarchically lower than the input layer comprising a plurality of output nodes, for indicating and identifying the structure of the material under analysis; and
      (iii) a plurality of synaptic connections, each of which connects a node in a hierarchically higher layer to a plurality of nodes in a hierarchically lower layer; and each of which features a synaptic strength value which has been generated during a back-propagation learning process using spectral data from organic materials analogous to the organic material under analysis; and
      (iv) each of the nodes featuring a threshold value which has been generated during a back propagation learning process using spectral data from organic materials analogous to the organic material under analysis; and
   (g) applying the digital data corresponding to incremental portions of the spectral information relating to the material to the input nodes of the off-line neural network in order generate information at the output nodes that is useful to indicate and identify the structure of the material under analysis.

45. A method according to claim 44 in which the step of supplying at least one off-line neural network comprises supplying an off-line neural network that includes at least one hidden layer hierarchically intermediate an input and the output layer comprising a plurality of hidden nodes.

46. A method according to claim 44 in which the analytical means comprise gas chromatograph and mass spectrograph means.

47. A method according to claim 44 in which the off-line neural network contains two input layers of neurons, one input layer corresponding to mass spectral information and the other input layer corresponding to gas chromatograph information.

48. A method according to claim 45 in which the off-line neural network contains a single hidden layer, and the neurons in the mass spectral information input layer and the neurons in the gas chromatograph information input layer are each connected to each neuron in the hidden layer.

49. A method according to claim 45 in which the off-line neural network contains two hidden layers, a first in which each neuron is connected to every neuron in the mass spectral information input layer and a second in which each neuron is connected to every neuron in the gas chromatograph information input layer, and the neurons in each hidden layer are each connected to each neuron in the output layer.

50. A method for analyzing and identifying the structure of a particular organic material by recognizing patterns in spectral information that are characteristic of such materials, comprising the steps of:
   (a) subjecting the organic material under analysis to a first and a second type of energy in at least one spectroscopy device;
   (b) sensing transformations in the energy imparted by the material in the device;
   (c) producing a first and second set of spectral information corresponding to the transformations in the first and second energy types and to the structure of the material;
   (d) selecting portions of the spectral information which are desired for use in identifying the material;
   (e) digitizing a plurality of incremental portions of the selected spectral information;
   (f) supplying at least one off-line neural network which comprises:
      (i) at least one input layer comprising a plurality of input nodes, each of which is capable of receiving digital data corresponding to an incremental portion of the spectral information;
      (ii) an output layer hierarchically lower than the input layer comprising a plurality of output nodes, for indicating and identifying the structure of the material under analysis;
      (iii) a plurality of synaptic connections, each of which connects a node in a hierarchically higher layer to a plurality of nodes in a hierarchically lower layer; and each of which features a synaptic strength value which has been generated during a back-propagation learning process using spectral data from organic materials analogous to the organic material under analysis; and
      (iv) each of the nodes featuring a threshold value which has been generated during a back propagation learning process using spectral data from organic materials analogous to the organic material under analysis; and
   (g) applying the digital data corresponding to incremental portions of the spectral information relating to the material to the input nodes of the neural network in order to generate information at the output nodes that is useful to indicate and identify the structure of the material under analysis.

51. A method according to claim 50 in which the step of supplying at least one off-line neural network comprises supplying at least one off-line neural network which includes at least one hidden layer hierarchically intermediate an input and the output layer comprising a plurality of hidden nodes.

52. A method according to claim 50 in which the off-line neural network contains two input layers of neurons, one input layer corresponding to the first information set and the other input layer corresponding to the second information set.

53. A method according to claim 51 in which the off-line neural network contains a single hidden layer, and the neurons in the first information set input layer and the neurons in the second information set input layer are each connected to each neuron in the hidden layer.

54. A method according to claim 51 in which the off-line neural network contains two hidden layers, a first in which each neuron is connected to every neuron in the first information set input layer and a second in which each neuron is connected to every neuron in the second information set input layer, and the neurons in each hidden layer are each connected to each neuron in the output layer.

55. A method according to claim 50 in which steps (a) through (c) are performed in separate spectroscopy devices.

56. A method according to claim 25 in which the generated information corresponds to close structural relatives to the material under analysis.

57. A method according to claim 35 in which the generated information corresponds to close structural relatives to the material under analysis.

* * * * *

UNITED STATES PATENT AND TRADEMARK OFFICE
CERTIFICATE OF CORRECTION

PATENT NO. : 5,218,529

DATED : June 8, 1993

INVENTOR(S) : Bernd J. Meyer et al.

It is certified that error appears in the above-identified patent and that said Letters Patent is hereby corrected as shown below:

```
Column 2, line 20, before the word "see" insert --[--

Column 7, line 20, after the word "carbohydrates"
insert a period

Column 12, line 28, delete the word "weight" and insert
--weights--
```

Signed and Sealed this

First Day of March, 1994

Attest:

BRUCE LEHMAN

Attesting Officer

Commissioner of Patents and Trademarks